US012812678B2

(12) United States Patent
Nayak et al.

(10) Patent No.: US 12,812,678 B2
(45) Date of Patent: Nov. 24, 2026

(54) QOS PROCEDURES FOR WLAN

(71) Applicant: Samsung Electronics Co., Ltd., Suwon-si (KR)

(72) Inventors: Peshal Nayak, Plano, TX (US); Boon Loong Ng, Plano, TX (US); Rubayet Shafin, Allen, TX (US); Vishnu Vardhan Ratnam, Plano, TX (US); Yue Qi, Plano, TX (US); Elliot Jen, Taipei City (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 18/627,317

(22) Filed: Apr. 4, 2024

(65) Prior Publication Data

US 2024/0357649 A1 Oct. 24, 2024

Related U.S. Application Data

(60) Provisional application No. 63/523,819, filed on Jun. 28, 2023, provisional application No. 63/523,198, filed on Jun. 26, 2023, provisional application No. 63/460,738, filed on Apr. 20, 2023, provisional application No. 63/458,846, filed on Apr. 12, 2023.

(51) Int. Cl.

| | |
|---|---|
| ***H04W 74/0816*** | (2024.01) |
| ***H04W 36/08*** | (2009.01) |
| ***H04W 74/08*** | (2024.01) |

(52) U.S. Cl.

CPC ....... *H04W 74/0816* (2013.01); *H04W 36/08* (2013.01); *H04W 74/0875* (2013.01)

(58) Field of Classification Search

CPC ......... H04W 74/0816; H04W 74/0875; H04W 36/08; H04W 84/12

See application file for complete search history.

(56) References Cited

U.S. PATENT DOCUMENTS

| | | | | |
|---|---|---|---|---|
| 7,639,658 | B2 * | 12/2009 | Frederiks | H04W 74/02 370/328 |
| 2006/0227733 | A1 | 10/2006 | Frederiks et al. | |
| 2018/0310211 | A1 * | 10/2018 | Su | H04W 36/34 |
| 2019/0029037 | A1 | 1/2019 | Wang et al. | |

(Continued)

FOREIGN PATENT DOCUMENTS

| | | | |
|---|---|---|---|
| WO | 2021224326 | A1 | 11/2021 |
| WO | 2022200912 | A1 | 9/2022 |

OTHER PUBLICATIONS

International Search Report and Written Opinion issued Jul. 22, 2024 regarding International Application No. PCT/KR2024/004805, 10 pages.

(Continued)

*Primary Examiner* — Brian T Le

(57) ABSTRACT

Methods and apparatuses for facilitating quality of service (QOS) enhancements to support low latency operations in a wireless local area network (WLAN). A station (STA) comprises a processor and a transceiver operably coupled to the processor. The transceiver is configured to obtain a transmission opportunity (TXOP). The processor is configured to determine that at least a portion of the TXOP will go unused by the STA and handover the unused portion of the TXOP to an access point (AP).

18 Claims, 28 Drawing Sheets

(56) References Cited

U.S. PATENT DOCUMENTS

2023/0107240 A1 4/2023 Sundman
2023/0171806 A1* 6/2023 Sundman ................ H04L 5/001
370/329

OTHER PUBLICATIONS

Chu et al., "Extended TXOP Sharing", Doc.: IEEE 802.11-23/0249r0, Apr. 2023, 14 pages.
IEEE P802.11be—D2.0 "Part 11: Wireless LAN Medium Access Control (MAC) and Physical Layer (PHY) Specifications—Amendment 8: Enhancements for extremely high throughput (EHT)" May 2022, 873 pages.
IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.
IEEE P802.11be—D3.0 "Part 11: Wireless LAN Medium Access Control (MAC) and Physical Layer (PHY) Specifications—Amendment 8: Enhancements for extremely high throughput (EHT)"Jan. 2023, 999 pages.
IEEE P802.11 Real Time Applications TIG Report, IEEE 802.11-18/2009r6, Nov. 2018, 43 pages.
Supplementary European Search Report dated Apr. 13, 2026, in connection with European Patent Application No. 24789028.8, 11 pages.

* cited by examiner

400

| AC | CWmin | CWmax | AIFSN | TXOP limit | | | | |
|---|---|---|---|---|---|---|---|---|
| | | | | For PHYs defined in Clause 15 and Clause 16 | For PHYs defined in Clause 17, Clause 18, Clause 19, and Clause 21 | For PHY defined in Clause 22 | Clause 23 | Other PHYs |
| AC_BK | aCWmin | aCWmax | 7 | 3.264 ms | 2.528 ms | 0 | 15.008 ms | 0 |
| AC_BE | aCWmin | aCWmax | 3 | 3.264 ms | 2.528 ms | 0 | 15.008 ms | 0 |
| AC_VI | (aCWmin+1)/2 – 1 | aCWmin | 2 | 6.016 ms | 4.096 ms | 22.56 ms (BCU: 6 or 7 MHz), 16.92 ms (BCU: 8 MHz) | 15.008 ms | 0 |
| AC_VO | (aCWmin+1)/4 – 1 | (aCWmin+1)/2 – 1 | 2 | 3.264 ms | 2.080 ms | 11.28 ms (BCU: 6 or 7 MHz), 8.46 ms (BCU: 8 MHz) | 15.008 ms | 0 |

FIG. 4

| | Stream info | ACI Bitmap | Scaling Factor | Queue Size All | Link ID |
|---|---|---|---|---|---|
| Bits: | 8 | 4 | 2 | 8 | 4 |

3000

| | Element ID | Length | Element ID Extension | Per stream report list |
|---|---|---|---|---|
| Octets: | 1 | 1 | 1 | Variable |

3100

| | Stream information | Scaling factor | Queue size all | Link ID | ACI Bitmap | Timing info list | Air time requirement | L4S presence indicator |
|---|---|---|---|---|---|---|---|---|
| Bits: | 8 | 2 | 8 | 4 | 4 | variable | 8 | 1 |

3300

| | Frame Control | Duration | RA | TA | BA Control | BA Information | Traffic report | FCS |
|---|---|---|---|---|---|---|---|---|
| Octets: | 2 | 2 | 6 | 6 | 2 | variable | variable | 4 |

3700

| | Frame Control | Duration | RA | TA | Traffic information request list | FCS |
|---|---|---|---|---|---|---|
| Octets: | 2 | 2 | 6 | 6 | variable | 4 |

3800

| | Stream info | TID bitmap | Timing information request | Link ID | Airtime requirement | L4S presence indicator |
|---|---|---|---|---|---|---|
| bits: | 8 | 16 | 1 | 4 | 1 | 1 |

QOS PROCEDURES FOR WLAN

CROSS-REFERENCE TO RELATED APPLICATION AND CLAIM OF PRIORITY

This application claims priority under 35 U.S.C. § 119 (e) to U.S. Provisional Patent Application No. 63/458,846 filed on Apr. 12, 2023; U.S. Provisional Patent Application No. 63/460,738 filed on Apr. 20, 2023; U.S. Provisional Patent Application No. 63/523,198 filed on Jun. 26, 2023; and U.S. Provisional Patent Application No. 63/523,819 filed on Jun. 28, 2023, which are hereby incorporated by reference in their entirety.

TECHNICAL FIELD

This disclosure relates generally to low latency operations in wireless communications systems. Embodiments of this disclosure relate to methods and apparatuses that facilitate quality of service enhancements to support low latency operations in a wireless local area network communications system.

BACKGROUND

Wireless local area network (WLAN) technology allows devices to access the internet in the 2.4 gigahertz (GHz), 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. The component of an MLD that is responsible for transmission and reception on one link is referred to as a station (STA). With bandwidth aggregation across multiple channels/bands, MLO offers significant gain in throughput and latency performance compared to single link operation in the previous generation (802.11ax).

The ultra-high reliability study group (UHR SG) which is the study group for next generation WI-FI standards design (IEEE 802.11bn) has set a number of objectives for next generation WI-FI network design. The group intends to achieve the ultra-high reliability target by reducing latencies to ultra-low values, increasing throughputs at different signal-to-noise ratio (SNR) levels, enhancing power savings, etc.

SUMMARY

Embodiments of the present disclosure provide methods and apparatuses that facilitate quality of service (QOS) enhancements to support low latency operations in a WLAN.

In one embodiment, a wireless STA device comprises a transceiver and a processor operably coupled to the transceiver. The transceiver is configured to obtain a transmission opportunity (TXOP). The processor is configured to determine that at least a portion of the TXOP will go unused by the STA, and handover the unused portion of the TXOP to an AP.

In another embodiment, a method performed by a wireless STA device comprises the steps of obtaining a TXOP, determining that at least a portion of the TXOP will go unused by the STA, and handing over the unused portion of the TXOP to an AP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C. As used herein, such terms as “1st” and “2nd,” or “first” and “second” may be used to simply distinguish a corresponding component from another and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents are incorporated by reference herein in their entirety:

[1] IEEE P802.11be/D2.0, 2022.

[2] IEEE Std 802.11-2020.

[3] IEEE 802.11 Real Time Applications TIG Report, IEEE 802.11-18/2009r6.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates an example EDCA parameter set according to embodiments of the present disclosure;

DETAILED DESCRIPTION

FIGS. 1 through 48, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that QoS enhancements are one of the key objectives of next generation WI-FI systems in order to support new use cases with extremely low latency applications. Such applications can have a last hop latency requirement on the scale of a few milliseconds, and for some such applications near lossless performance is also expected.

Accordingly, embodiments of the present disclosure provide procedures and devices that facilitate QoS enhancements to support such low latency (e.g., extremely low latency) operations. Embodiments of the present disclosure include TXOP handover procedures, latency reporting procedures, traffic stream information reporting procedures, and stream ID based traffic treatment procedures.

Figure 1:
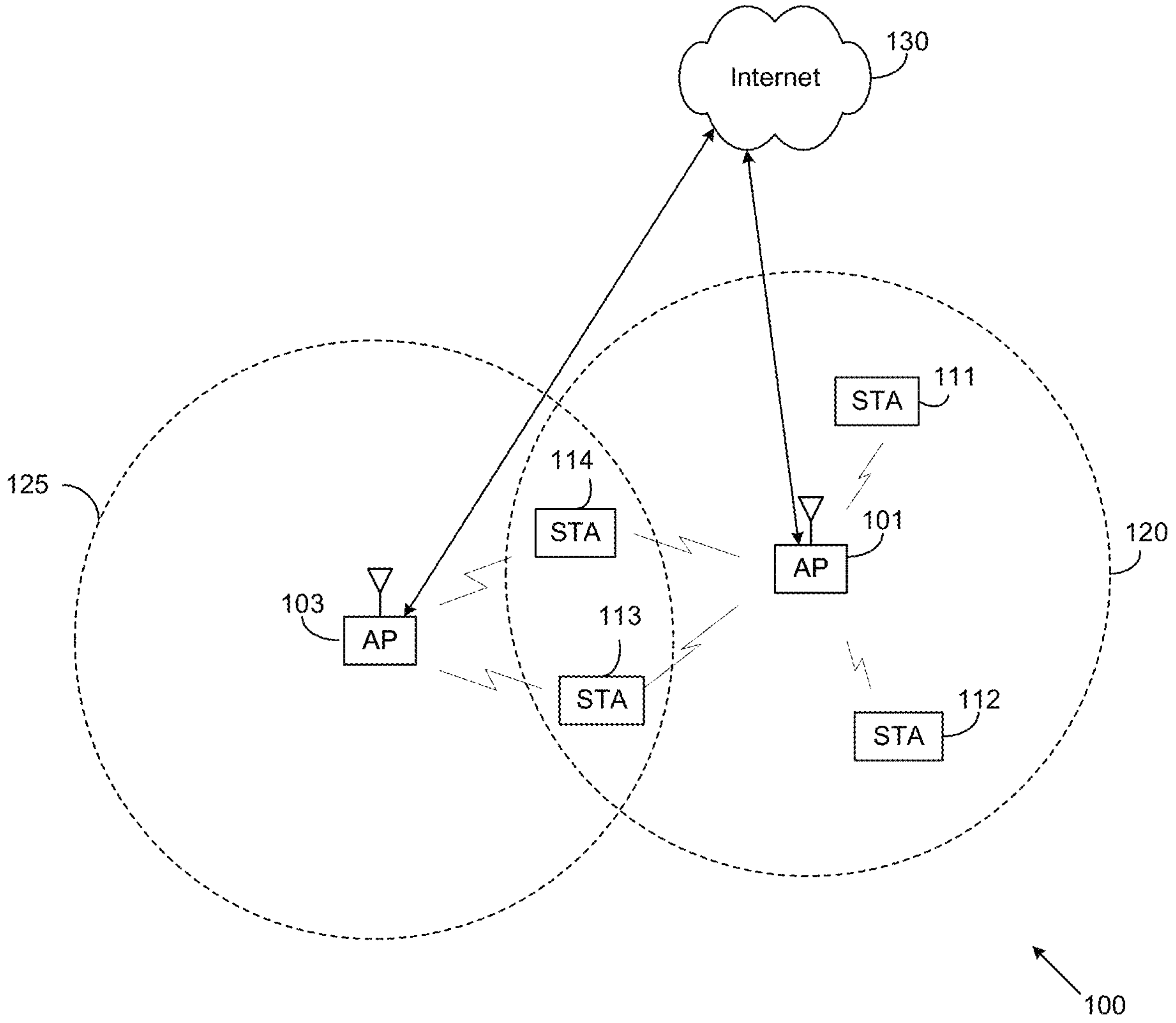
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
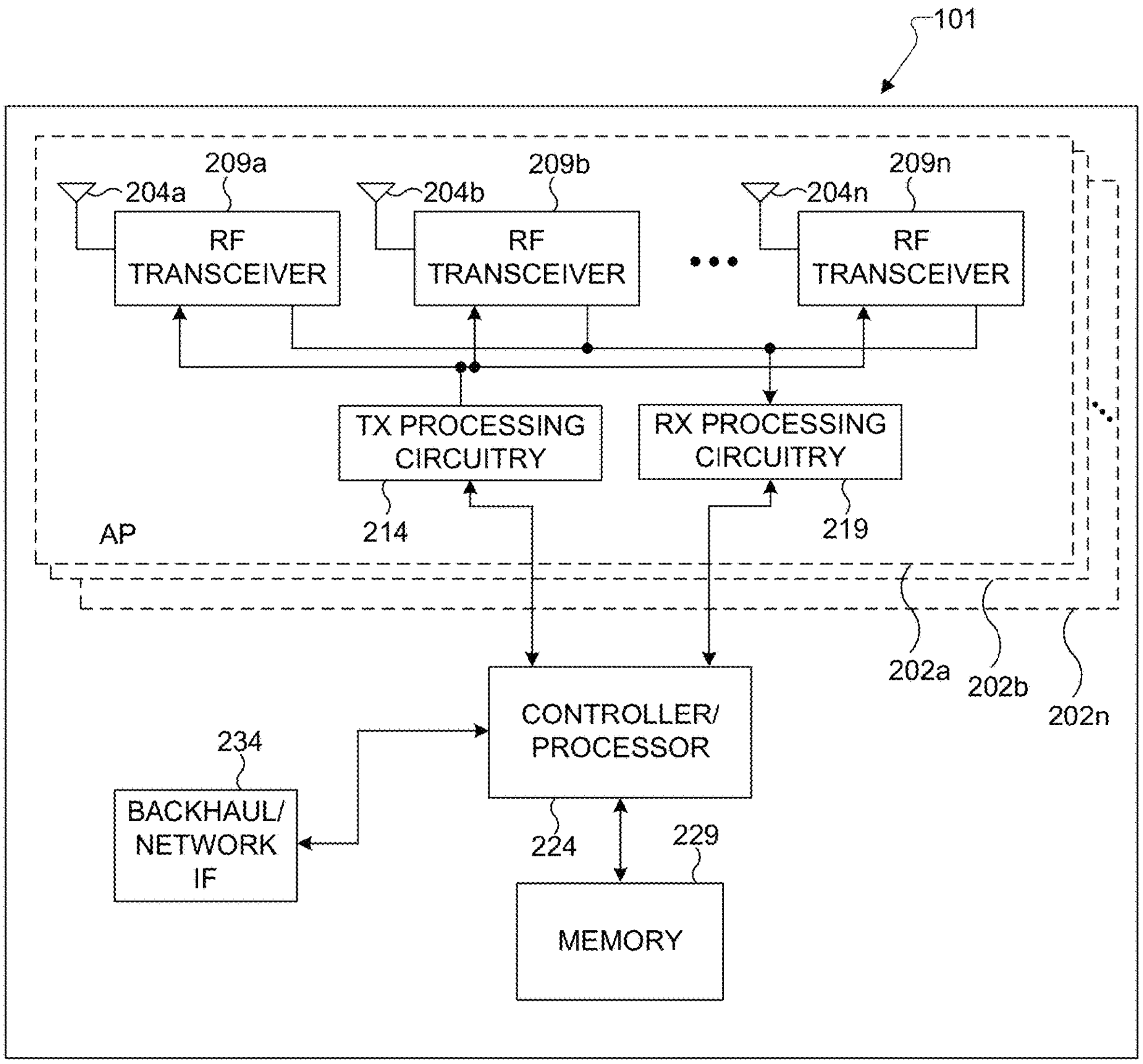
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202*a*-202*n* (which may be referred to, for example, as AP1-APn). Each of the affiliated APs 202*a*-202*n* includes multiple antennas 204*a*-204*n*, multiple RF transceivers 209*a*-209*n*, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202*a*-202*n* may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202*a*-202*n*.

For each affiliated AP 202*a*-202*n*, the RF transceivers 209*a*-209*n* receive, from the antennas 204*a*-204*n*, incoming RF signals, such as signals transmitted by STAs in the network 100. In some embodiments, each affiliated AP 202*a*-202*n* operates at a different bandwidth, e.g., 2.4 GHz, 5 GHZ, or 6 GHz, and accordingly the incoming RF signals received by each affiliated AP may be at a different frequency of RF. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202*a*-202*n*, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-convert the baseband or IF signals to RF signals that are transmitted via the antennas 204*a*-204*n*. In embodiments wherein each affiliated AP 202*a*-202*n* operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). The controller/processor 224 could also facilitate QoS enhancements to support low latency operations in a WLAN. Any of a wide variety of other functions could be supported in the AP MLD 101 by the controller/processor 224. In some embodiments, the controller/processor 224 includes at least one microprocessor or microcontroller. The controller/processor 224 is also capable of executing programs and other processes resident in the memory 229, such as operations for facilitating QoS enhancements to support low latency operations in a WLAN. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connections. For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202*a*-202*n* is shown as including a single instance of TX processing circuitry 214 and a single instance of RX processing circuitry 219, the AP MLD 101 could include multiple instances of each (such as one per RF transceiver) in one or more of the affiliated APs 202*a*-202*n*. Alternatively, only one antenna and RF transceiver path may be included in one or more of the affiliated APs 202*a*-202*n*, such as in legacy APs. Also, various components in FIG. 2A could be combined, further subdivided, or omitted and additional components could be added according to particular needs.

Figure 2B:
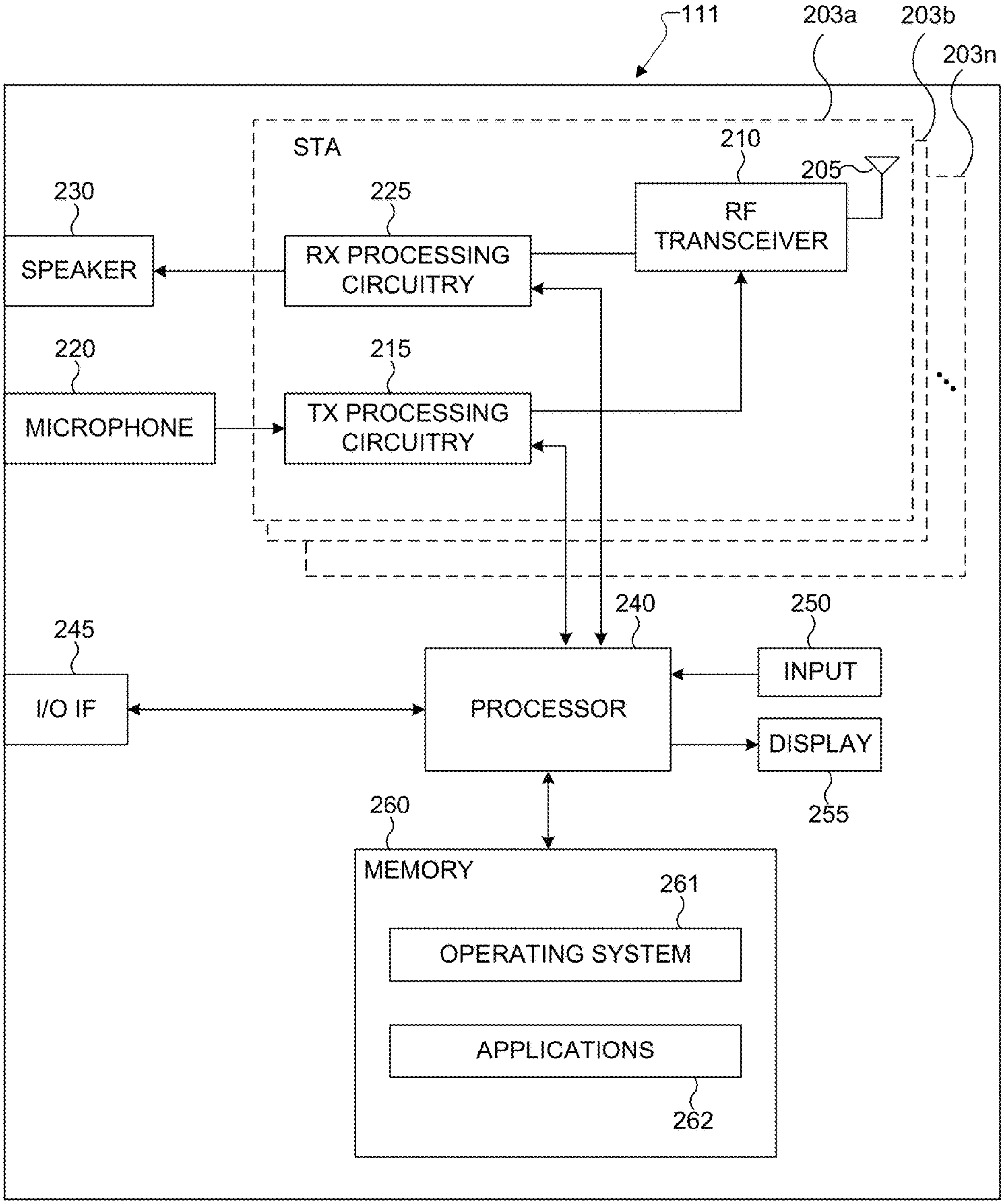
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203*a*-203*n* (which may be referred to, for example, as STA1-STAn). Each of the affiliated STAs 203*a*-203*n* includes antennas 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203*a*-203*n* may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203*a*-203*n*.

For each affiliated STA 203*a*-203*n*, the RF transceiver 210 receives from the antennas 205, an incoming RF signal transmitted by an AP of the network 100. In some embodiments, each affiliated STA 203*a*-203*n* operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203*a*-203*n*, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antennas 205. In embodiments wherein each affiliated STA 203*a*-203*n* operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate QoS enhancements to support low latency operations in a WLAN. In some embodiments, the controller/processor 240 includes at least one microprocessor or microcontroller.

The controller/processor 240 is also capable of executing other processes and programs resident in the memory 260, such as operations for facilitating QoS enhancements to support low latency operations in a WLAN. The controller/processor 240 can move data into or out of the memory 260 as required by an executing process. In some embodiments, the controller/processor 240 is configured to execute a plurality of applications 262, such as applications for facilitating QoS enhancements to support low latency operations in a WLAN. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antennas 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Some new ultra-low latency applications that the UHR group has considered to provide support for in next generation WI-FI networks are shown in Table 1 below. For each application category, the table below shows the requirements in terms of intra-BSS (basic service set) latency (which is the time to transmit a frame from the AP to the STA or vice versa), the jitter variance, packet loss and data rate (in Mbps).

TABLE 1

| Use cases | | Intra BSS latency (ms) | Jitter variance (ms) | Packet loss | Data rate (Mbps) |
|---|---|---|---|---|---|
| Real-time gaming | | <5 | <2 | <0.1% | <1 |
| Cloud gaming | | <10 | <2 | Near-lossless | <0.1 (Reverse link) >5 Mbps (Forward link) |
| Real-time video | | <3~10 | <1~2.5 | Near-lossless | 100~28,000 |
| Robotics and industrial automation | Equipment control | <1~10 | <0.2~2 | Near-lossless | <1 |
| | Human safety | <1~10 | <0.2~2 | Near-lossless | <1 |
| | Haptic technology | <1~5 | <0.2~2 | Lossless | <1 |
| | Drone control | <100 | <10 | Lossless | <1 >100 with video |

In order to meet voice and video stream requirements over 802.11 WLAN, support for quality of service (QOS) traffic provides differentiated channel access to frames belonging to different priorities. This feature considers eight different user priorities, and four access categories (ACs) are derived from these user priorities for traffic stream prioritization. The four access categories which are supported are background (AC_BK), best effort (AC_BE), video (AC_VI) and voice (AC_VO). User priority 1 and 2 are mapped to AC_BK, user priority 0 and 3 to AC_BE, 4 and 5 to AC_VI and 6 and 7 to AC_VO.

Figure 3:
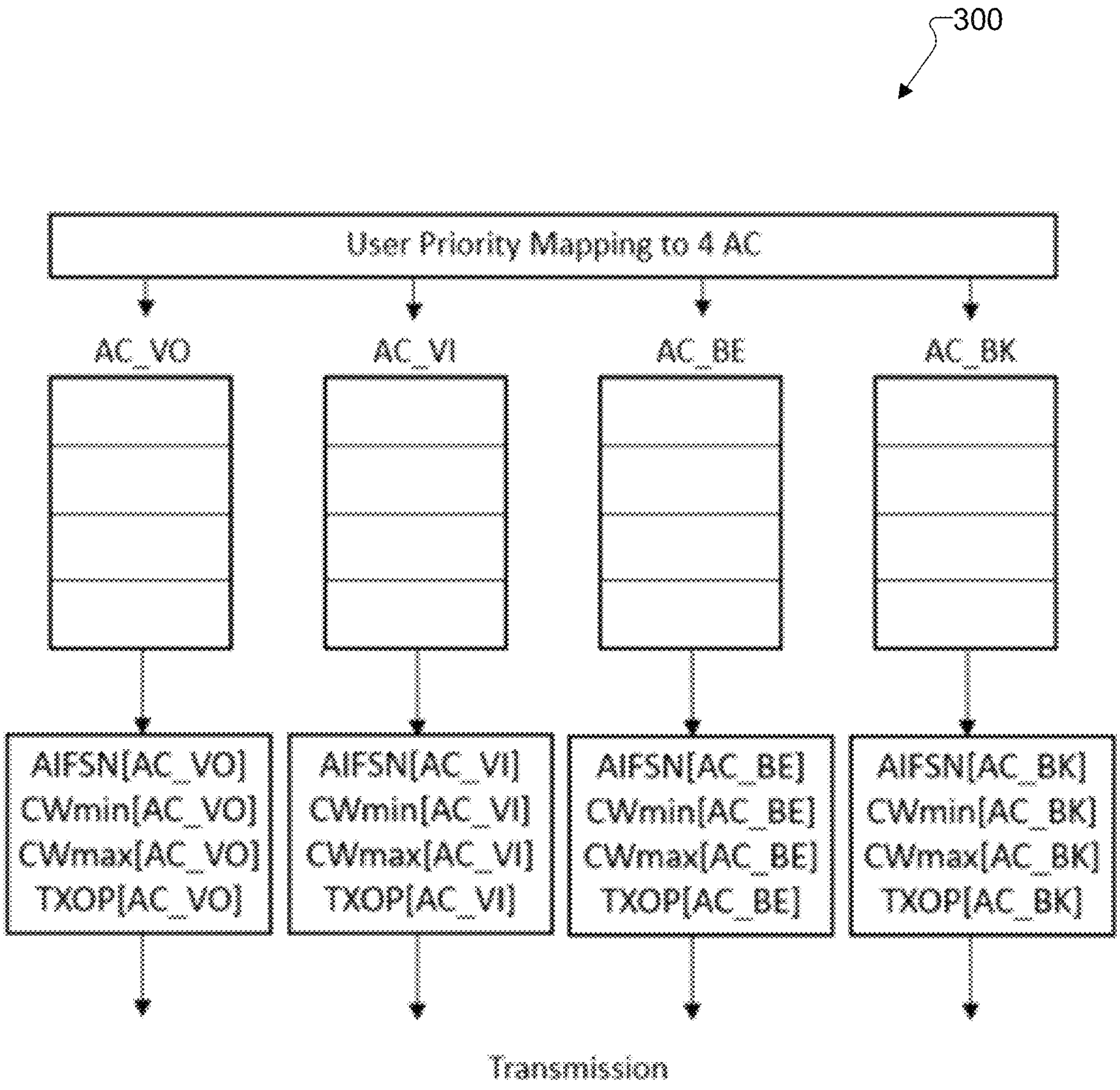
FIG. 3 illustrates an example procedure of AC transmission queues according to embodiments of the present disclosure.

FIG. 3 illustrates an example procedure 300 of AC transmission queues according to embodiments of the present disclosure. As illustrated in FIG. 3, the QoS feature considers an individual transmission queue for each AC wherein each queue behaves as an individual contending entity characterized by its own Enhanced Distributed Channel Access (EDCA) parameter set.

FIG. 4 illustrates an example EDCA parameter set 400 according to embodiments of the present disclosure. A summary of the EDCA parameter set element parameter values for different ACs in the 802.11 standards is illustrated in FIG. 4. The EDCA parameter set specifies a minimum and maximum value for contention window (CW), an arbitration inter-frame spacing (AIFSN) value and a transmit opportunity (TXOP) limit. When a particular AC completes its backoff and gains channel access, the STA can perform data transmission for an amount of time that is upper bounded by TXOP. By providing a larger TXOP value for AC_VI (e.g., in a majority of cases as shown in FIG. 4), the standard intends to increase the throughput of high priority data such as video.

As depicted in FIG. 4, except for the case of clause 23, the four ACs have a different TXOP value. Clause 23 assigns a value of 2.528 ms for the TXOP limit for AC_BK and AC_BE, 2.080 ms for AC_VO and 4.096 for AC_VI. However, to support higher throughput for video data, the AC_VI have been assigned much higher values for TXOP limit. Consequently, for these access categories, when a STA obtains channel access it can transmit as many aggregated frames as possible while staying within the TXOP limit.

The latency requirement for some of the applications considered for next generation WI-FI standards can be extremely low and that can make it hard to support such applications in WI-FI in scenarios in which delays of such levels are encountered in channel access alone. Accordingly, the present disclosure provides procedures that create more opportunities to reduce the latencies to support ultra-low latency applications in WI-FI.

Each device can obtain a TXOP with equal channel access probability, but the TXOP can be much larger than the device actually needs. For instance, in a scenario in which the device performs a video download, the backlog for downlink traffic can be much larger than the backlog for uplink traffic. Further, the STA may only be transmitting higher layer control frames (e.g., TCP ACKs which are 20 bytes long) which may not need the entire TXOP, leaving the remainder of the TXOP underutilized. The STA can terminate the TXOP early but that would open the channel for contention. Instead, these underutilized TXOPs can be leveraged to create opportunities for ultra-low/low latency application frame transmissions by allowing devices with ultra-low/low latency applications to transmit earlier by using the TXOP of another STA, thereby reducing the latency of the ultra-low/low latency applications.

Procedures to handover a TXOP captured by the STA can be beneficial for a number of purposes. E.g., it can enable the AP to serve either the STA's low latency traffic or the low latency traffic of other STAs in the network. In another example, it can enable a relay to transmit uplink frames of a STA to the AP.

Accordingly, the present disclosure provides a number of procedures that facilitate TXOP handover from a STA to an AP. Various embodiments of procedures and signaling for handover based on explicit AP-side notification are provided, as are various embodiments of procedures and signaling for handover without AP side indication, various embodiments of procedures and signaling for handover for a STA's own traffic, various embodiments of procedures and signaling for handover only for other STAs' traffic, various embodiments of AP side procedures and signaling for informing other STAs about the handover, and various embodiments of procedures and signaling for capability advertisement for both APs and STAs to advertise support for TXOP handover. STA and AP side behaviors are presented when necessary for each of the above cases.

According to one embodiment, a STA can handover its TXOP or a portion of its TXOP to the AP with which it is associated. Further according to this embodiment, the TXOP or a portion thereof that the STA hands over to the AP can be the TXOP or a portion thereof that the STA does not need for transmitting its own data (i.e., an unused portion of the TXOP). For instance, the STA may have a very small backlog and may not need the entire TXOP it has acquired. In such a situation, the STA can handover the remaining (unused) portion of its TXOP to the AP.

Figure 5:
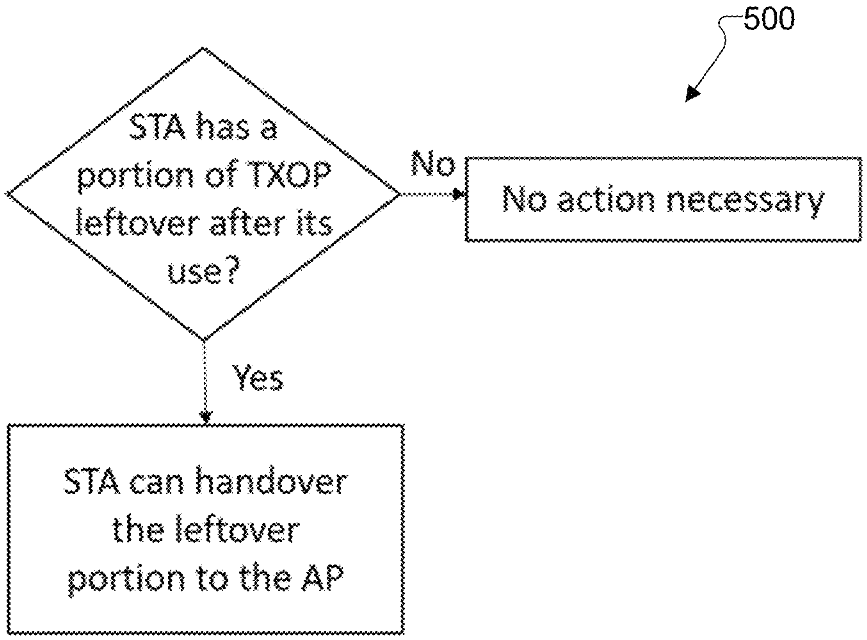
FIG. 5 illustrates an example procedure performed by a STA for TXOP handover according to embodiments of the present disclosure.

FIG. 5 illustrates an example procedure 500 performed by a STA for TXOP handover according to embodiments of the present disclosure. The STA may be, for example, one of STAs 111-114. For convenience of disclosure, it is understood that references to a STA in further embodiments of the present disclosure refer to one of STAs 111-114.

Figure 6:
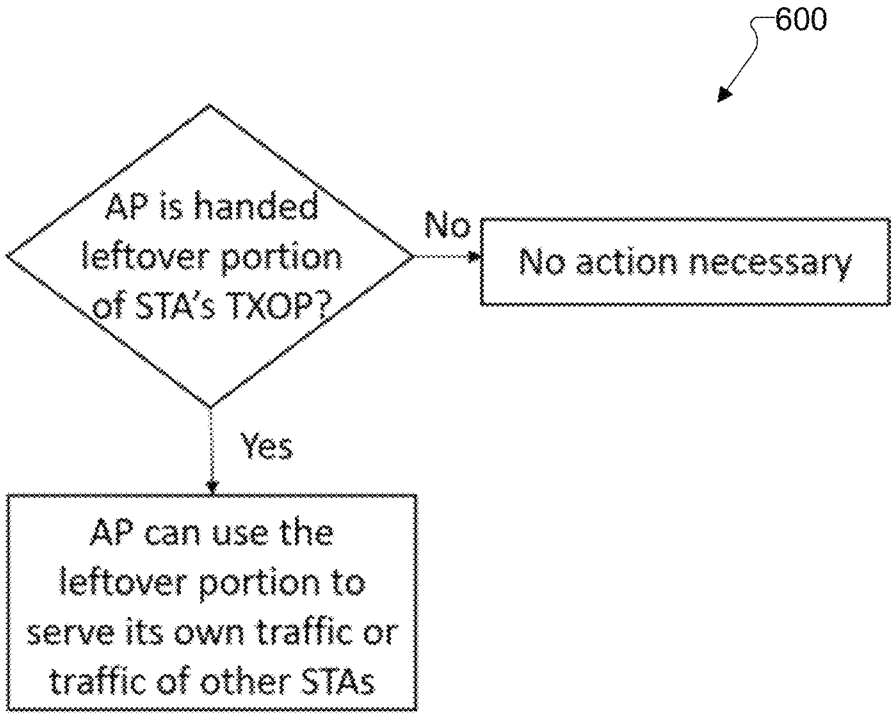
FIG. 6 illustrates an example procedure performed by an AP for handling the TXOP handed over by the STA according to embodiments of the present disclosure.

FIG. 6 illustrates an example procedure 600 performed by an AP for handling the TXOP handed over by the STA according to embodiments of the present disclosure. The AP may be, for example, one of APs 101 or 103. For convenience of disclosure, it is understood that references to an AP in further embodiments of the present disclosure refer to one of APs 101 or 103.

As illustrated in FIG. 6, the AP can use the TXOP or a portion of the TXOP that has been handed over to it for serving its own (downlink) traffic or for serving uplink traffic of other STAs. Further, according to this embodiment, the downlink and/or the uplink traffic that is served within the remaining (i.e., unused) portion of the STA's TXOP can be the traffic corresponding to low latency traffic. This can help to reduce the delays faced by low latency traffic which could otherwise have to contend for the channel access and face a channel access delay.

According to one embodiment, the AP can send a notification/request to the STA to inform the STA that the AP needs the unused portion of a TXOP that the STA has acquired—for example, the portion remaining after the STA completes the transmission of its own data in the TXOP.

Figure 7:
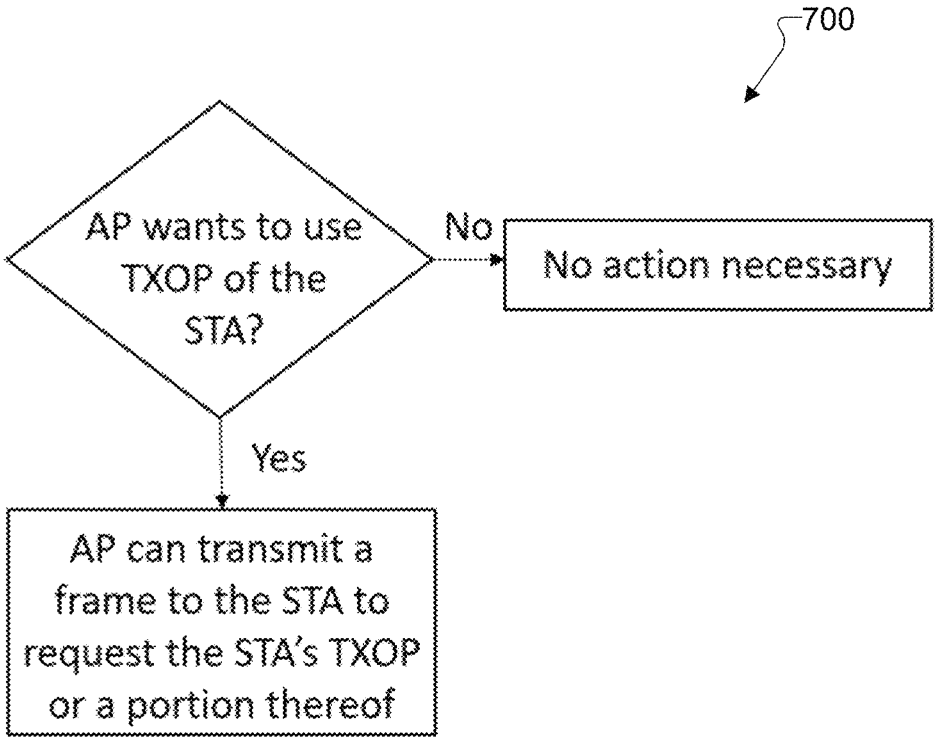
FIG. 7 illustrates an example procedure performed by an AP to explicitly notify the STA that the AP needs a TXOP handover according to embodiments of the present disclosure.

FIG. 7 illustrates an example procedure 700 performed by an AP to explicitly notify the STA that the AP needs a TXOP handover according to embodiments of the present disclosure. The notification/request sent by the AP to the STA can contain one or more of the information items as indicated in Table 2 below.

TABLE 2

| Information items | Description |
|---|---|
| Handover indication | An indication that the AP is requesting the handover of the STA's remainder portion of the TXOP for its own use or the use of other STAs in the network (e.g., for the transmission of low latency or ultralow latency application traffic from the AP on the downlink or those STAs on the uplink). E.g., this can be a bit set to 1 when the AP is making a handover request and set to 0 when the AP is not making a request. The bit can be included in any frame in the standard (e.g., Block ACK). |
| TXOP count indicator | An indication of how many TXOPs the AP is requesting the STA's assistance for. The STA can handover a portion of the TXOP for those many TXOPs. E.g., the AP can provide a count of the number of TXOPs for which it needs the handover from the STA. The STA can handover a portion of TXOP |
| Duration requirement indicator | An indicator of the duration for which the TXOP is needed. E.g., the duration for which the AP needs to do the downlink transmission and/or the duration for which the uplink transmission of another STA triggered by the AP can need. |
| Token | A token to be used as a reference for the AP's request. The same token can be used if the STA transmits any response/update related to this request. |

When the AP needs the STA's TXOP or a portion thereof, the AP can transmit one of more of the above information items to the STA in a frame that it transmits to the STA. This frame can be an independent frame or can be an existing frame in the standard (e.g., block ACK).

For instance, if one or more of the above information items are transmitted by the AP in a block ACK, the AP can send the information to the STA in the block ACK sent as a response to the STA's own uplink transmission. In another example, when the above frame can be transmitted independently, the AP can transmit the frame after/piggybacked on the block ACK sent as a response to the STA's own uplink transmission.

According to one embodiment, when the STA receives a request for handover from the AP, the STA can transmit a frame to the AP in response. This frame is referred to as a handover frame in this disclosure.

Figure 8:
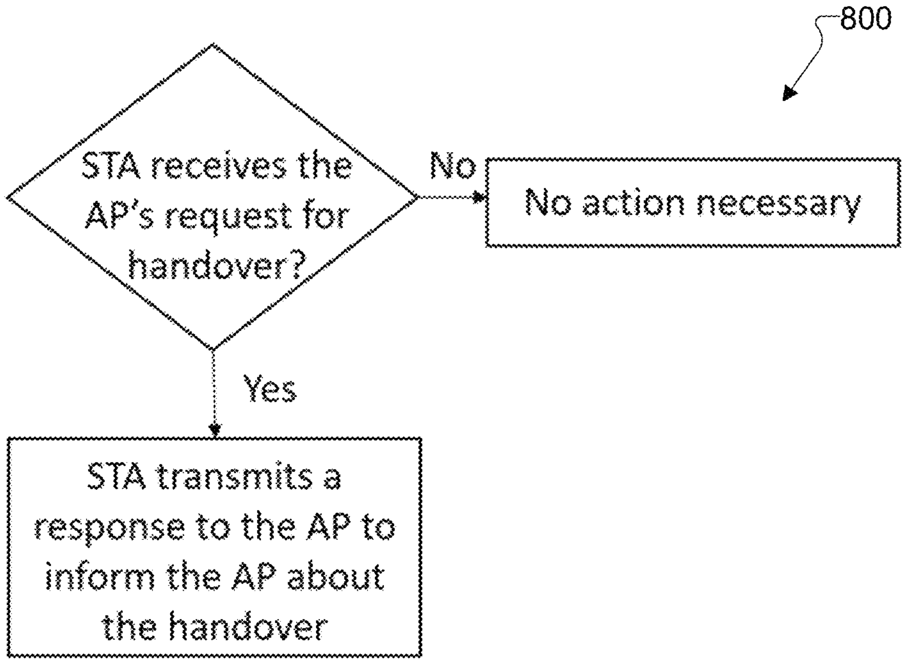
FIG. 8 illustrates an example procedure performed by a STA for responding to an explicit TXOP handover request/notification from the AP with a handover frame according to embodiments of the present disclosure.

FIG. 8 illustrates an example procedure 800 performed by a STA for responding to an explicit TXOP handover request/notification from the AP with a handover frame according to embodiments of the present disclosure. According to this embodiment, the handover frame can contain one or more of the information items indicated in Table 3.

TABLE 3

| Information items | Description |
|---|---|
| Handover indication | An indication that the STA is handing over its TXOP or a portion thereof to the AP. E.g., this indication can be done via a bit that is set to 1 to indicate that the STA is handing over its TXOP or a portion thereof and set to 0 if the STA does not do the handover. |
| Duration indication | The duration for which the STA is handing over the TXOP to the AP. E.g., this can be either the remaining portion of the TXOP or a part of the remaining portion of the TXOP. The AP can return the TXOP to the STA after this duration. This can be useful if the STA anticipates that it may have its own traffic (e.g., low latency traffic) packet arrival after this duration and can be transmitted in this TXOP itself. |
| Return requirement | An indication to the AP if the STA expects the AP to return the TXOP to the STA after the AP's use is done. E.g., this can be a one bit value that can be set to 1 if the STA expects the AP to return the TXOP and set to 0 if it does not. |
| (No) return action requirement | An indication on how the AP can return the remaining portion of the TXOP after its usage is complete. E.g., AP can send another notification to the STA or STA can implicitly assume that the AP has return the TXOP after the AP's use is complete. If the STA does not require the AP to return the TXOP after its use, the STA can also indicate to the AP what actions the AP can take after its usage is done. E.g., AP can transmit a frame (e.g., CF-end frame) and end the TXOP on its own. |
| Prioritization requirement | An indication that the STA expects the AP to prioritize the STA's DL traffic for transmission within the portion of the TXOP that the AP will use. In one embodiment, the STA can make a request and the AP can comply with it. In another embodiment, it can be up to the AP to decide whether or not such a request can be granted or not. |

One or more of the above information items can be transmitted in an independent frame (e.g., handover frame) or in any of the existing frames in the standard.

According to one embodiment, when the STA receives a request from the AP for a handover, the STA can handover the TXOP or a portion thereof to the AP without any explicit notification.

Figure 9:
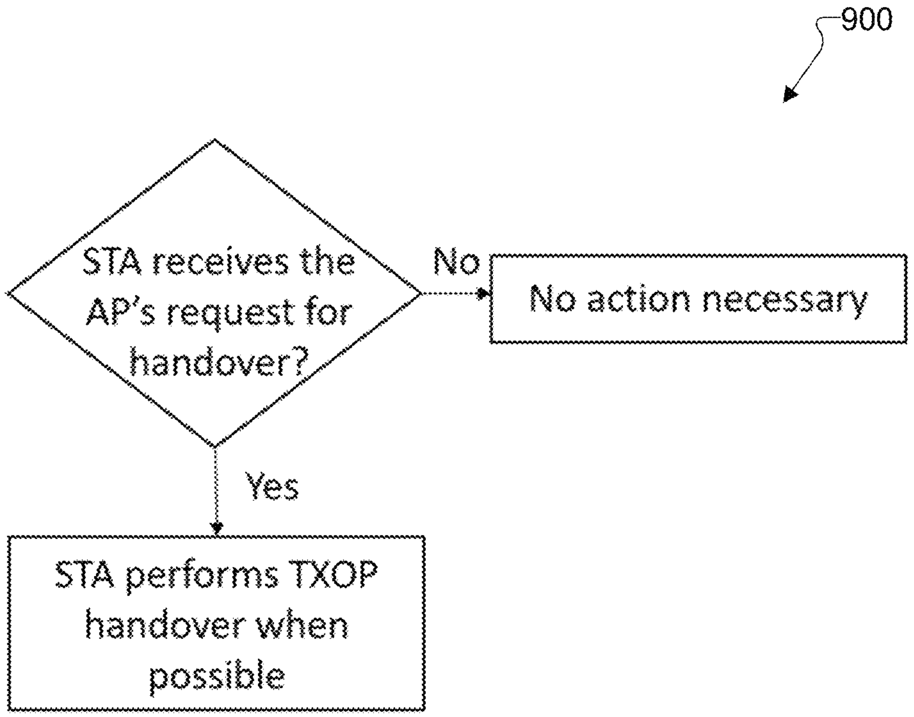
FIG. 9 illustrates an example procedure performed by a STA for handing over a TXOP in response to an explicit TXOP handover request/notification from the AP without sending a notification to the AP according to embodiments of the present disclosure.

FIG. 9 illustrates an example procedure 900 performed by a STA for handing over a TXOP in response to an explicit TXOP handover request/notification from the AP without sending a notification to the AP according to embodiments of the present disclosure. The AP can use the remainder portion of the TXOP according to its needs (e.g., to transmit DL LL traffic and/or UL LL traffic). Upon completing its usage, the AP can terminate the TXOP (e.g., by transmitting a CF-end frame).

According to other embodiments, the AP may not send any notification to request that the STA handover its TXOP or a portion thereof to the AP. According to this embodiment, there can be an agreement between the AP and the STA for participation in handover. Further according to this embodiment, the agreement can be either explicit or implicit.

In embodiments in which the AP and the STA can have an explicit agreement to participate in a TXOP handover arrangement, the AP can transmit a frame to the STA to request the STA's participation.

Figure 10:
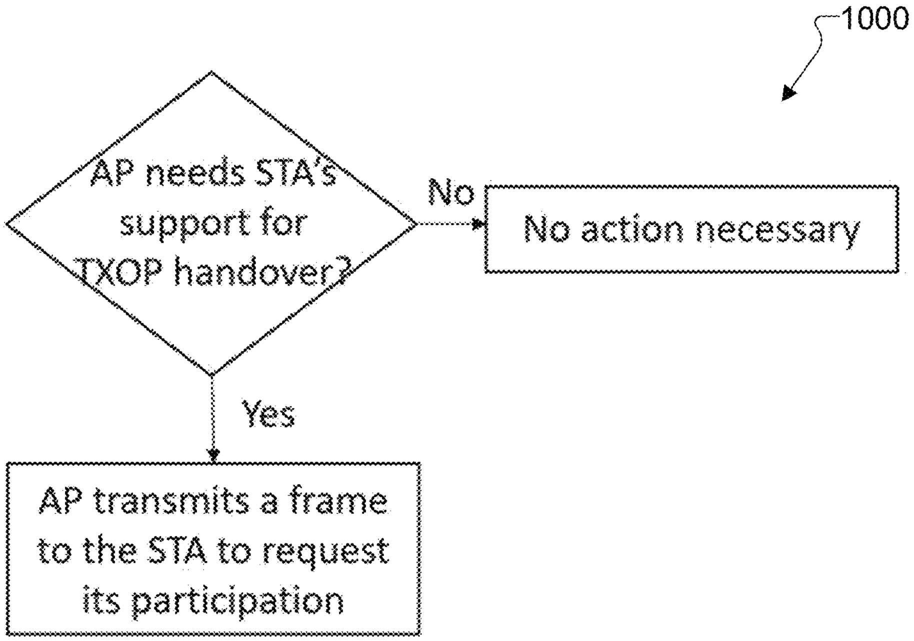
FIG. 10 illustrates an example procedure performed by an AP for setting up an explicit agreement to participate in TXOP handover according to embodiments of the present disclosure.

FIG. 10 illustrates an example procedure 1000 performed by an AP for setting up an explicit agreement to participate in TXOP handover according to embodiments of the present disclosure. The frame transmitted by the AP can contain one or more of the information items as indicated in Table 4 below.

TABLE 4

| Information items | Description |
|---|---|
| Request indication | An indication that the AP is requesting the STA's participation in the TXOP handover procedure. E.g., this can be a reason code that can take a predetermined value to indicate that the reason for sending the frame is to request the STA's participation in the handover procedure. |
| Dialogue token | A dialogue token that can be used to refer to this request. |
| Participation time | The duration for which the STA's participation is being requested. E.g., the time can be indicated in terms of TBTT. |

The above information can be transmitted by the AP in an independent frame or in any of the frames existing in the standard.

When the STA receives the above frame from the AP, the STA can respond with a response frame. The response frame can contain one or more of the information items as indicated in Table 5 below.

TABLE 5

| Information items | Description |
|---|---|
| Response indication | An indication that the STA is responding to the AP's request for participation in the TXOP handover procedure. E.g., this can be a reason code that can take a predetermined value to indicate that the reason for sending the frame is to respond to the AP's request for participation in the handover procedure. |
| Dialogue token | A dialogue token that can be the same as the dialogue token in the request frame from the AP. |
| Response | An indication for the response itself to inform the AP if the STA accepts the AP's request or not. E.g., this can be a one bit value that can be set to 1 to indicate that the STA accepts the request and to zero to indicate that it rejects. |
| Participation time | The duration for which the STA can participate in TXOP handover. E.g., the time can be indicated in terms of TBTT. |

One or more of the above information items can be transmitted in an independent frame or in any of the frames existing in the standard.

Figure 11:
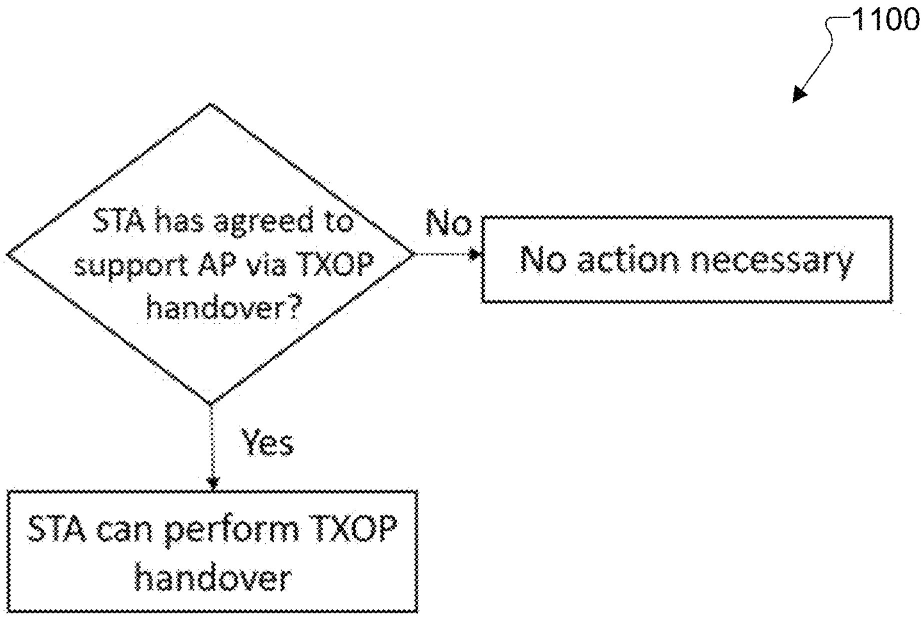
FIG. 11 illustrates an example procedure performed by a STA for responding to a request from the AP to participate in TXOP handover according to embodiments of the present disclosure.

FIG. 11 illustrates an example procedure 1100 performed by a STA for responding to a request from the AP to participate in TXOP handover according to embodiments of the present disclosure. If the STA agrees to the AP's request, then the STA can perform TXOP handover to the AP as illustrated in FIG. 11.

If the AP receives such a response from the STA, the AP can count on the STA's assistance to provide additional support for LL traffic. Consequently, when providing latency guarantees/possibilities to devices with such traffic (e.g., via SCS (stream classification service) request and response framework) the AP can make use of this knowledge of how many other STAs have agreed to participate in TXOP handover process.

In another embodiment, when the AP transmits a frame to request the STA's participation the STA does not send a response, but instead is required to participate in TXOP handover from that point onwards.

In embodiments in which there is an implicit agreement between the AP and the STA, certain STAs can be required to participate in TXOP handover. E.g., if the STA has its own LL traffic, then it can support other LL traffic of other STAs and get support from such STAs in return. In another example, if the STA has high DL PPDU receptions that can cause a delay to LL traffic, then the STA can be required to compensate for that delay by providing assistance in TXOP handover.

According to one embodiment, there no agreement may exist between the AP and the STA for participation in TXOP handover. According to this embodiment, the STA can decide for each TXOP if it wants to handover the unused or remaining portion of the TXOP or not. The STA can transmit a handover frame to the AP to notify the AP when it hands over the TXOP or a portion thereof to the AP. The handover to the AP can be performed with or without the use of a handover frame, similar to the procedures discussed herein above with respect to FIGS. 8 and 9, respectively.

If a handover frame is used, the handover frame can be transmitted at a point where other STAs can also hear it—e.g., at the start of the TXOP. Thus, the other STAs that can expect to receive traffic from the AP due to their traffic getting served during a TXOP handover can stay awake to receive the traffic from the AP if scheduled.

According to another embodiment, the STA can participate in the TXOP handover for receiving its DL LL traffic alone.

Figure 12:
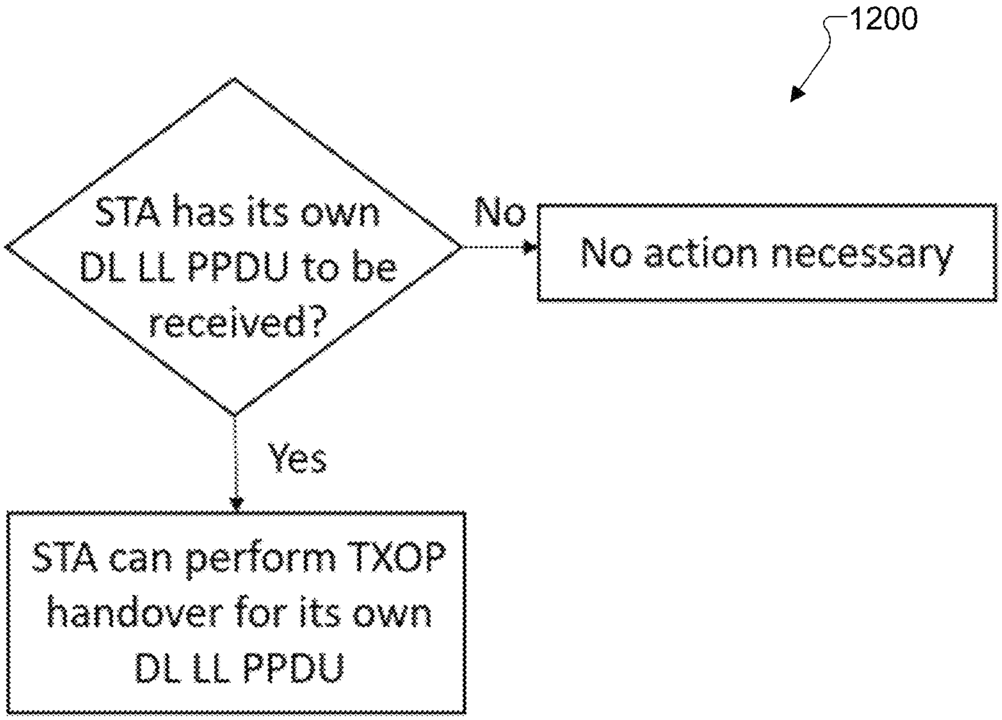
FIG. 12 illustrates an example procedure performed by a STA for participating in TXOP handover only for its own DL LL traffic according to embodiments of the present disclosure.

FIG. 12 illustrates an example procedure 1200 performed by a STA for participating in TXOP handover only for its own DL LL traffic according to embodiments of the present disclosure. According to this embodiment, the STA can perform a handover to the AP when it knows that it has DL LL traffic from the AP. The AP can then transmit the DL LL PPDU (or whatever portion of this PPDU can be transmitted) within the remaining portion of the TXOP of the STA.

According to one embodiment, the STA can contend for the channel and, if successful, handover its TXOP to the AP for supporting LL traffic. This STA may not have traffic of its own and can be solely contending for the TXOP to support other LL STA's traffic. This feature can, for example, be used to enable a special device that can be deployed in an area to assist LL traffic STAs. The device can capture the channel and handover to the AP when possible to help the AP to support LL traffic latency requirements.

According to one embodiment, after the AP receives the STA's TXOP, the AP can transmit a frame to inform other STAs that that the AP has received a portion of one STA's TXOP. This frame can also be used to wake up other STAs or inform them that they will be receiving frames within the other STA's TXOP.

An AP that supports the capability to participate in TXOP handover can advertise this capability. According to this embodiment, the AP can advertise its capability in one or more frames that it transmits to the STAs (e.g., management frames such as beacons). The STAs that receive the frames can discover the AP's support for this capability.

Figure 13:
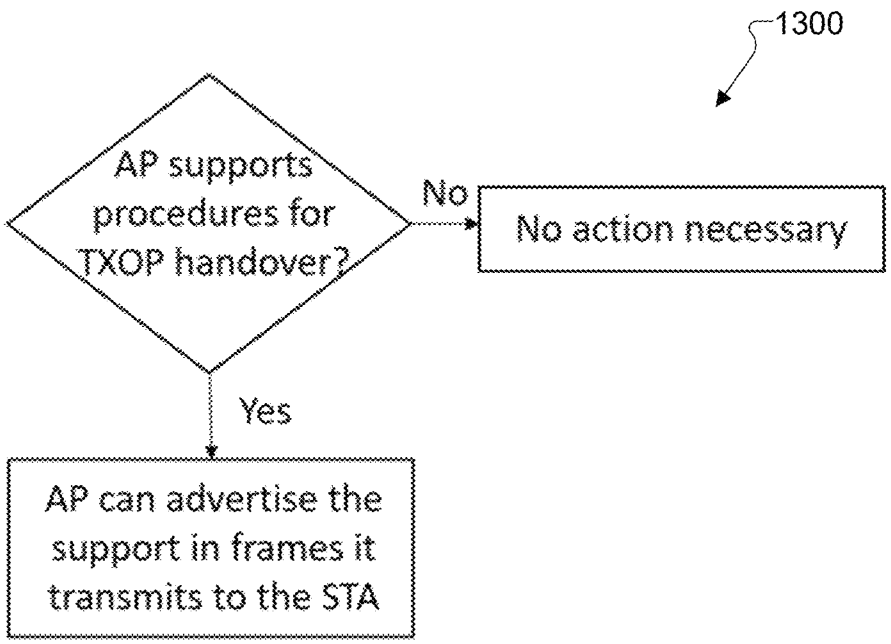
FIG. 13 illustrates an example procedure performed by an AP to advertise its capability to participate in TXOP handover according to embodiments of the present disclosure.

FIG. 13 illustrates an example procedure 1300 performed by an AP to advertise its capability to participate in TXOP handover according to embodiments of the present disclosure.

A STA that supports the capability to participate in TXOP handover can advertise this capability. According to this embodiment, the STA can advertise its capability in one or more frames that it transmits to the AP (e.g., management frames such as probe request frames). The AP that receives such frames from the STA can then discover the STA's support for this capability and act accordingly.

Figure 14:
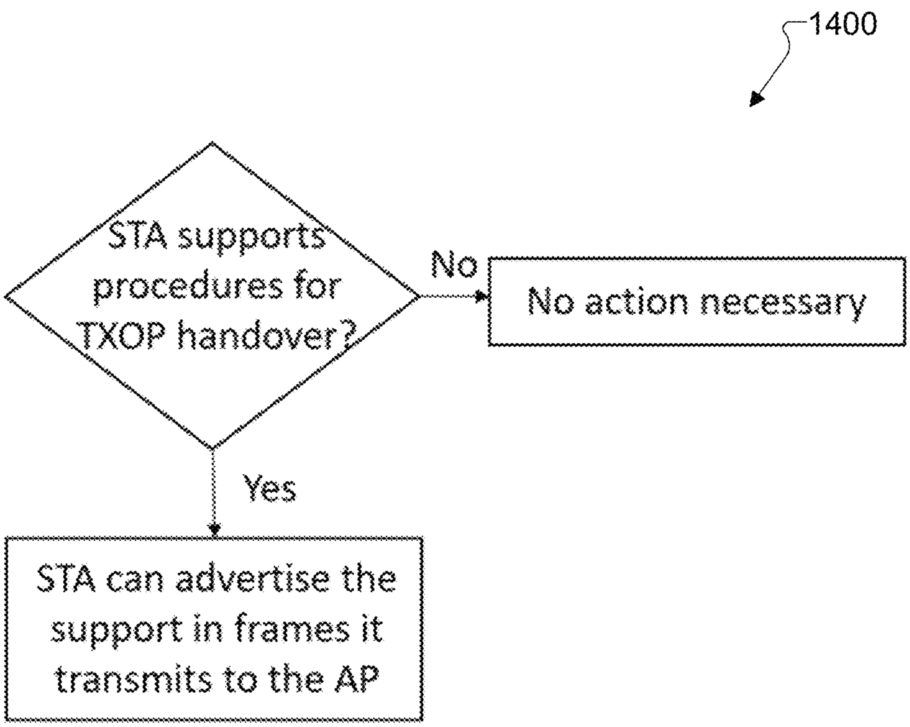
FIG. 14 illustrates an example procedure performed by a STA to advertise its capability to participate in TXOP handover according to embodiments of the present disclosure.

FIG. 14 illustrates an example procedure 1400 performed by a STA to advertise its capability to participate in TXOP handover according to embodiments of the present disclosure.

Though some of the procedures described above explain AP and STA behavior in the context of single link operations, they are not to be interpreted as being restrictive to single link operation in any way. The above procedures can apply to multi-link operation as well. When the procedures are used for MLO, the frames described in this disclosure can also carry a link ID indicator which can indicate the links for which request, and response/handover frames are meant. E.g., this can be a link bitmap in which a bit for each of the links to which the response corresponds is set to 1. Alternatively, this can be a list of link IDs or an individual link ID. Further, the frames can be transmitted on any of the links setup between the AP MLD and the non-AP MLD.

Though the above procedures and signaling are described for the purpose of latency reduction and ultra-low latency application support, they can be used for other purposes beyond latency reduction (e.g., interference reduction in multi-AP scenarios).

Ensuring that a STA with an ultra-low latency application does not face poor latency in real time can be essential to support such applications in next generation WI-FI networks. E.g., if a STA is running a cloud gaming application and has a latency sensitivity of 5 ms, it can be important for the AP to ensure that the STA's latency is within this bound. To reduce the latencies that are faced by a STA, an AP needs to know the latencies that the STA's traffic encounters and the root causes for poor latency performance. This knowledge can enable the AP to take appropriate actions to reduce the STA's latencies.

For the purpose of disclosure, two types of latencies are considered. Downlink latency, which is the time from when a packet is queued at the AP to when the STA receives it, and uplink latency, which is the time from when a packet is queued at the STA to when the AP receives it.

Figure 15:
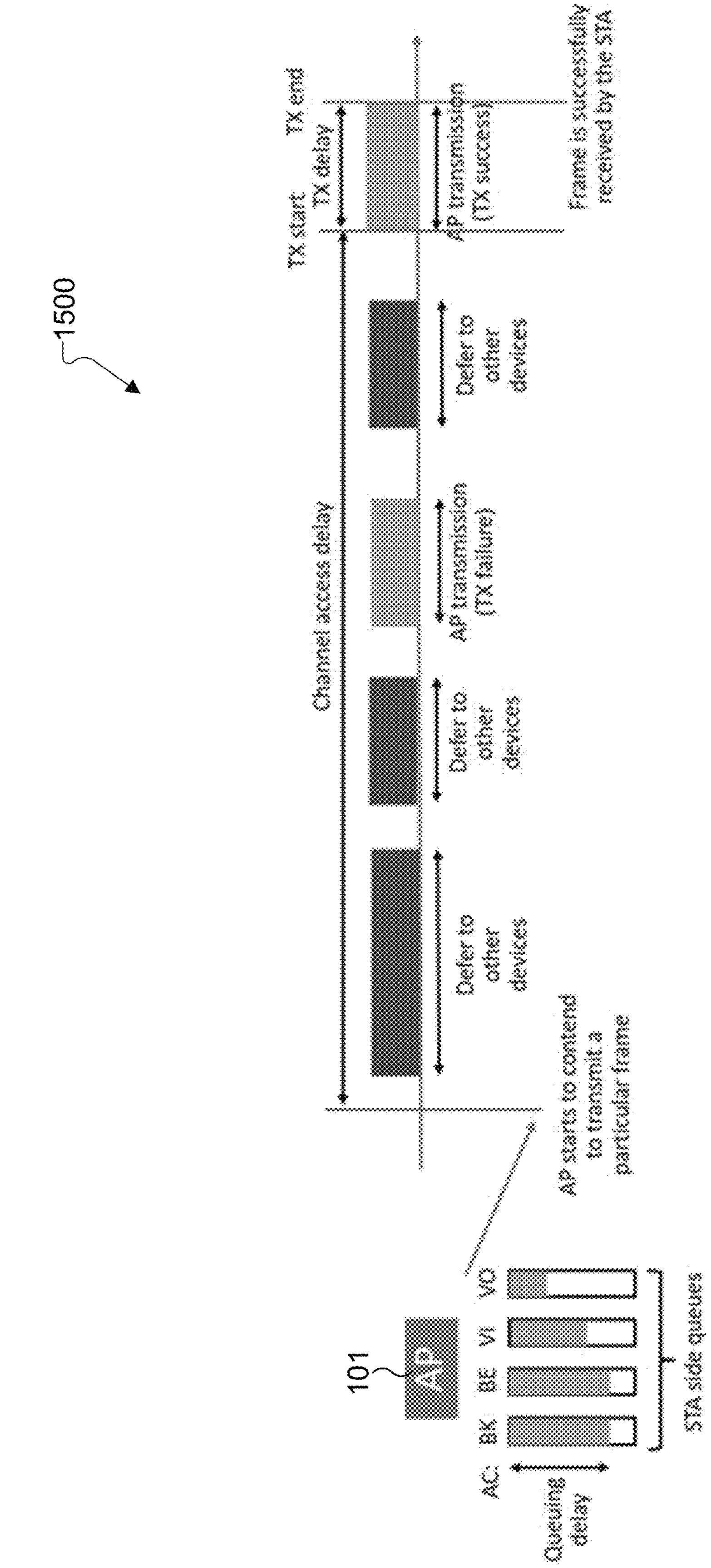
FIG. 15 illustrates an example timing diagram of the delays encountered by a downlink packet going from the AP to the STA according to embodiments of the present disclosure.

FIG. 15 illustrates an example timing diagram 1500 of the delays encountered by a downlink packet going from the AP to the STA according to embodiments of the present disclosure. As illustrated in FIG. 15, the downlink latency, which is the total time from when the packet gets enqueued at the AP to when the STA receives it, comprises queuing delay, channel access delay, and TX delay.

Upon enqueue, the packet first faces a queuing delay as it makes its way through the packet queue for the given access category. Channel access delay is the time to gain access to the channel and make a successful transmission, which comprises time to contend (contention delay), defer delays as the AP defers to transmissions of other devices on the channel, and delays due to unsuccessful transmissions (if any). TX delay is the time to transmit the frame, which comprises time to send the MAC layer frame, Block ACK, any overhead, interframe spacings, etc.

Table 6 shows the analysis of the observability of the downlink latency and its components at the AP-side.

TABLE 6

| Delay | AP-side knowledge for computation | Observability at the AP-side |
| --- | --- | --- |
| Queuing delay | To compute the queuing delay, AP needs to know the enqueue and dequeue timestamps for downlink packet. As these operations occur at the AP-side, AP can have the knowledge of these timestamps | Yes |
| Channel access delay | To compute the channel access delay, AP needs to know the time when packet reaches head of the line and AP starts to contend to transmit the packet and when packet's successful transmission starts. These operations are carried out by the AP and hence the AP can have a knowledge of these timestamps. | Yes |
| Contention delay | To compute the contention delay, the AP needs to know the cumulative duration from the contention slots that were chosen for a particular transmission and the slot duration. For downlink transmission, the contention operations are carried out at the AP side. So, AP can have a direct knowledge of the delay. | Yes |

TABLE 6-continued

| Delay | AP-side knowledge for computation | Observability at the AP-side |
|---|---|---|
| Defer delay | To compute the defer delay, the AP needs to know the time that the channel was captured by another device and the AP had to defer its transmission. As the AP monitors the channel and defers its transmissions, it can compute the defer delay. | Yes |
| Delays from unsuccessful transmissions | As the AP is the transmitter, the AP can compute this delay | Yes |
| Transmission delay | As the AP is the transmitter, the AP can compute this delay | Yes |

As shown in Table 6, the AP can directly observe and compute the downlink latency and its constituent components as the operations for downlink transmissions are carried out at the AP-side. The AP can also assess the root cause for downlink latency and its constituent components since it can directly observe the factors that hinder its transmission. E.g., if the AP faces a large defer delay, it can assess if the defer delay was caused by a transmission in the BSS or in a neighboring BSS. Thus, the knowledge of delay components can provide the AP with insight into why the downlink latency is high, which component is causing it to become high and the cause for the high component delay. This can enable the AP to take appropriate action to reduce downlink latency and verify based on future observations of the latency value if the action taken by the AP created the desired effect or not.

Figure 16:
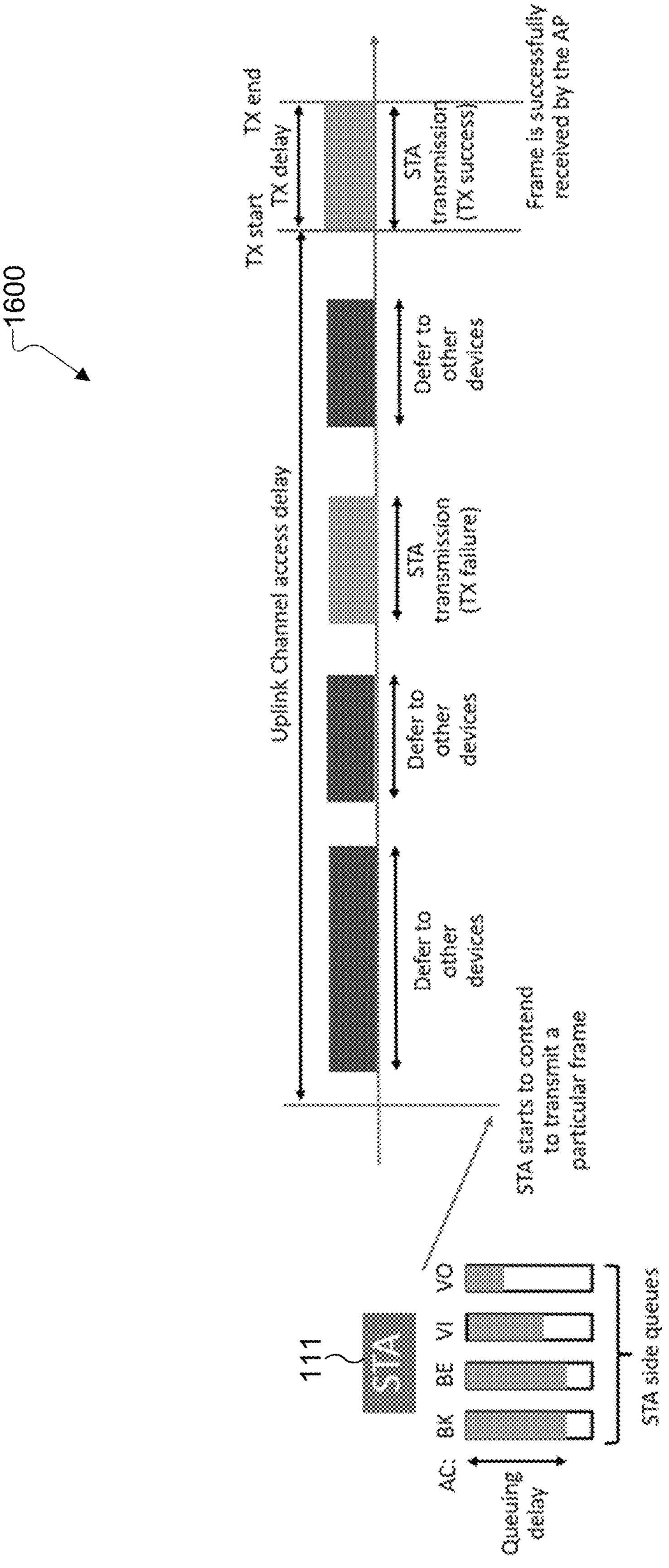
FIG. 16 illustrates an example timing diagram of the delays encountered by an uplink packet going from the STA to the AP according to embodiments of the present disclosure.

FIG. 16 illustrates an example timing diagram 1600 of the delays encountered by an uplink packet going from the STA to the AP according to embodiments of the present disclosure. As illustrated in FIG. 16, the uplink latency can be broken down into similar constituent components as the downlink latency-queuing delay, channel access delay, and TX delay.

Table 7 shows the analysis of the observability (or lack thereof) of the downlink latency and its components at the AP-side.

TABLE 7

| Delay | AP-side knowledge for computation | Observability at the AP-side |
|---|---|---|
| Queuing delay | To compute the queuing delay, AP needs to know the enqueue and dequeue timestamps for uplink packet. As these operations occur at the STA-side, AP cannot have the knowledge of these timestamps | No |
| Channel access delay | To compute the channel access delay, AP needs to know the time when packet reaches head of the line at the STA-side and the STA starts to contend to transmit the packet and when packet's successful transmission starts. The reception of the packet is carried out at the AP-side. So, AP can observe the timestamp when the successful transmission started. But AP does not have knowledge of the time when the STA started to contend to transmit the packet as that operation is carried out at the STA side. So, AP cannot have the knowledge of the timestamps. | No |
| Contention delay | To compute the contention delay, the AP needs to know the cumulative duration from the contention slots that were chosen for a particular transmission at the STA side and the slot duration. For uplink transmission, the contention operations are carried out at the STA side. So, AP cannot have a direct knowledge of the delay. | No |
| Defer delay | To compute the defer delay, the time for which the STA deferred its transmission as it detected the channel as being busy from another transmission. As this operation is carried out at the STA side, the AP cannot have a direct knowledge of this delay. | No |
| Delays from unsuccessful transmissions | AP does not know each unsuccessful transmission of the STA. If the transmission is partly successful or the corresponding control frames of the transmission were received by the AP (e.g., RTS/CTS), then AP can infer that this delay. | Yes in some cases and No in some cases |
| Transmission delay | As the AP is the transmitter, the AP can compute this delay | Yes |

As shown in Table 7, the AP does not have knowledge of the total uplink latency and its constituent components. This lack of knowledge can create challenges for the AP from the point of view of latency reduction and support for ultra-low latency applications. For example, the AP does not know which STA is facing a large uplink latency and so does not know which STA needs its assistance—meanwhile, providing assistance to all STAs can result in wastage of resources without the need for AP support, with unclear benefits to each STA. Furthermore, the AP does not know the cause for the STA's large uplink latency. This is essential for the AP to assess which action can best help the STA.

Embodiments of the present disclosure provide a number of procedures that facilitate latency reporting to address the above issues. A framework for uplink latency, breakdown, and cause reporting is presented with AP and STA side procedures for reporting. A procedure for AP-side authorization is described, which can enable an AP to authorize specific STAs to provide the reporting. AP side actions based on STA side reporting are described, cross link requesting and reporting procedures are described, and capability advertisement procedures for the AP and STA side are described.

A framework for uplink latency, breakdown, and cause reporting can be referred to as virtual ping. According to one embodiment, the AP can request an uplink latency report from its associated STA.

Figure 17:
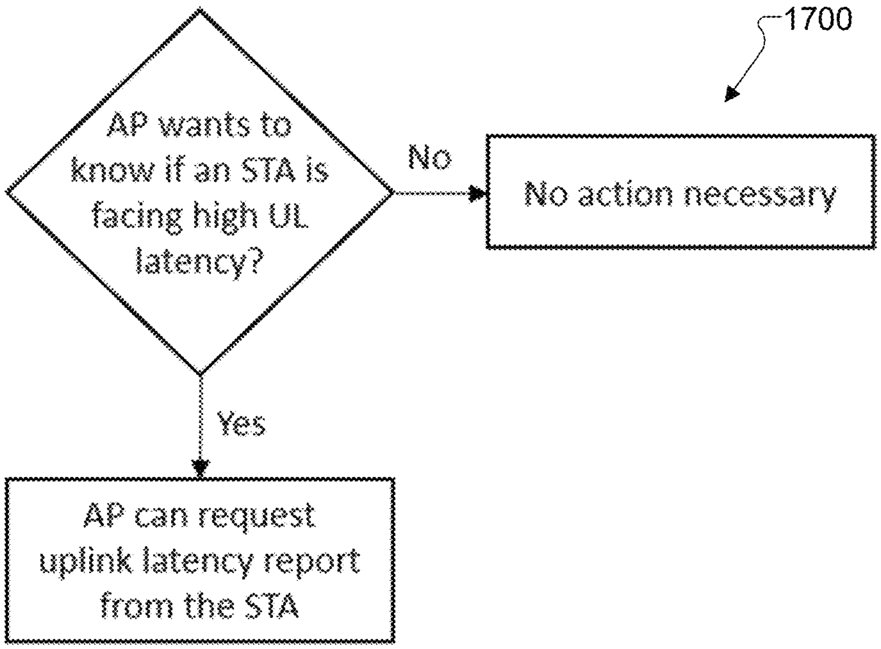
FIG. 17 illustrates an example procedure performed by an AP for requesting an uplink latency report from a STA according to embodiments of the present disclosure.

FIG. 17 illustrates an example procedure 1700 performed by an AP for requesting an uplink latency report from a STA according to embodiments of the present disclosure. According to this embodiment, the request from the AP can contain one or more of the information items that are described in Table 8 below.

TABLE 8

| Information item | Description |
|---|---|
| Reason code | A reason code to describe the nature of the request. E.g., a reason code to indicate that the request is being made for uplink latency report generation. |
| Dialogue token | A token for the request from the AP. The STA can include the token in its response. |
| STA identifier(s) | According to one embodiment, an AP can make a request from more than one STA. When the AP does so, the AP can put an identifier of such STAs (e.g., STA MAC address) in the request so that only the relevant STAs can respond. The AP can also group/multi-cast such request frames. When the AP sends the request frame as a unicast frame, this field can be the identifier of the STA for which it is intended. |
| Traffic identifier | An information item to indicate for which packet(s) the STA needs to report the latency for. The AP can provide an identifier for this purpose. E.g., TID, SCSID, etc. |
| Request info | The AP can either request at least one or more of the parameters associated with uplink latency. E.g., uplink latency itself, queuing delay, etc. The AP can make a request of all the parameters or only a subset of them. When the AP makes a request of only a subset of components, the AP can make an indication of which components it is requesting. For instance, this can be a bitmap in which various bits of the bitmap can correspond to various components of the uplink latency and its components. When the AP is making a request for a particular component, the AP can set the bit value to 1. |
| Measurement procedure info | The AP can also make an indication of how it would like the parameters to be measured. For example, the AP can request if the parameters need to be measured over a certain interval and if the STA needs to report all the statistics measured or only average values. |

The above frame can be an independent frame or any of the frame existing in the standard (e.g., measurement request frame).

The STA can transmit an uplink latency report to the AP either on its own (e.g., if it is facing poor uplink latency and needs AP side assistance in improving its latency) or upon request from the AP.

Figure 18:
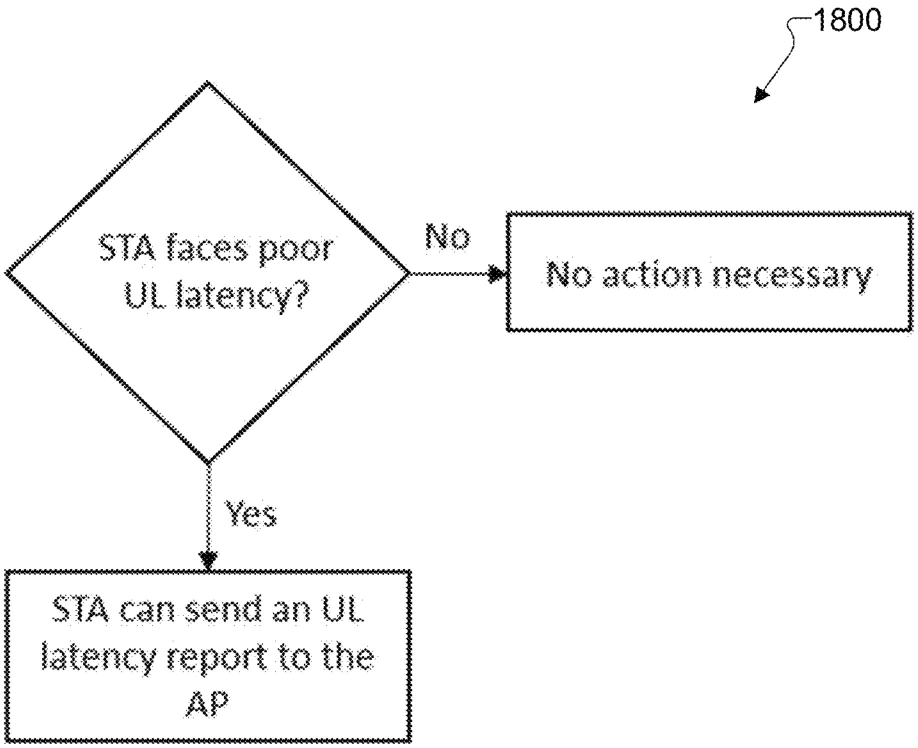
FIG. 18 illustrates an example procedure performed by a STA for uplink latency reporting to the AP according to embodiments of the present disclosure.

FIG. 18 illustrates an example procedure 1800 performed by a STA for uplink latency reporting to the AP according to embodiments of the present disclosure. The uplink latency report can contain one or more of the information items mentioned in Table 9 below.

TABLE 9

| Information item | Description |
|---|---|
| Uplink latency | An information item that describes the uplink latency value. E.g., the average uplink latency value. |
| Queuing delay information | An information item that describes the queuing delay at the STA side. STA can send the queuing delay information to the AP for each queue (e.g., each AC queue) at the STA side. E.g., the mean queueing delay per AC queue |
| Channel access delay | An information item that describes the channel access delay at the STA side. The channel access delay can also be for each AC queue. E.g., the mean channel access delay for video traffic queue. |
| Defer delay | An information item that describes the defer delay at the STA side. The STA can indicate the mean defer delay or individual defer delay values. E.g., each time the STA deferred to a transmission, how long the transmission lasted on the channel for. |
| Unsuccessful transmission statistics | An information item that describes unsuccessful transmission statistics. E.g., This can be the duration of the transmission plus any timeout periods. Alternatively, or along with this information, STA can also indicate the retransmission rate. This information can be indicated for each AC. |
| Transmission delay | An information item that describes the transmission delay which is the transmission time + overhead durations + block ACK duration + any interframe spacings. |
| Cause of poor delay | For one or more of the above parameters, the STA can also report the cause of the poor delay/statistic. E.g., if the defer delay is high, the STA can report the APs/STAs/BSSs to which it had to defer its transmissions. |
| Traffic identifier | An information item to indicate which traffic stream this information corresponds to. E.g., TID |
| Measurement process | The procedure by which the above information was measured. E.g., if it was measured over a certain interval and if the STA is reporting an average value of the above parameters over the interval |

The above information can be transmitted by the STA to the AP in an independent frame or in any of the frames existing in the standard (e.g., measurement response frames, control sub-field variant of A-control subfield).

According to another embodiment, the AP can authorize the STA to report the above statistics to the AP. The AP can authorize the STA on its own based on a criterion (e.g., the STA can have an ultra-low latency traffic) or can authorize the STA based on a request from the STA.

Figure 19:
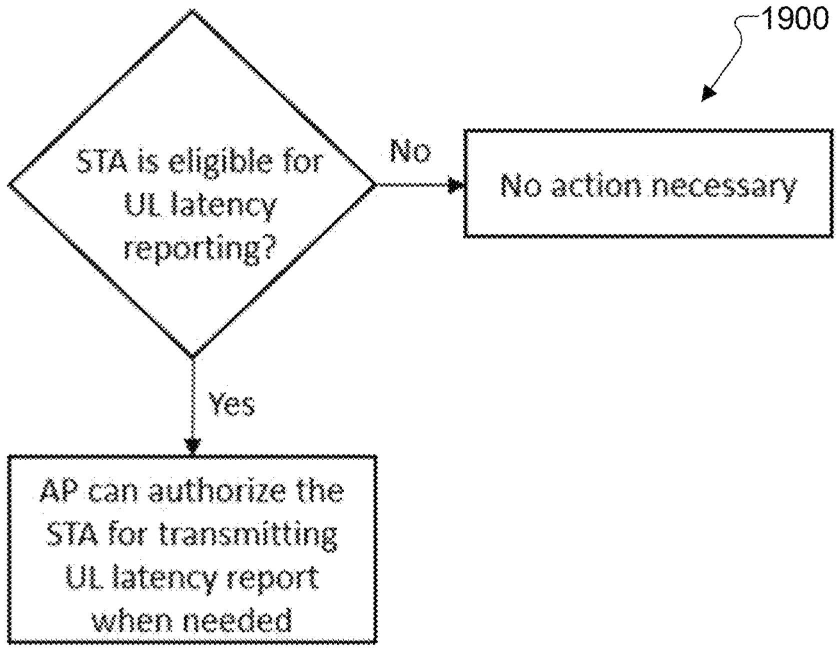
FIG. 19 illustrates an example procedure performed by an AP for authorizing a STA to perform uplink latency reporting according to embodiments of the present disclosure.

FIG. 19 illustrates an example procedure 1900 performed by an AP for authorizing a STA to perform uplink latency reporting according to embodiments of the present disclosure. The AP can authorize the STA to transmit uplink latency reports to it in a frame that the AP transmits to the STA. The frame can contain one or more of the information items that are indicated in Table 10 below.

TABLE 10

| Information item | Description |
|---|---|
| STA identifier(s) | An information item that describes which STAs have been authorized for the reporting process. E.g., this can be a list of STA MAC addresses. |
| Duration identifier(s) | A duration for which the above indicated STA can transmit the reports to the AP. The AP can either renew the STA's authorization after the duration is over or STA can stop reporting if AP does not renew. E.g., this can be a list of durations (e.g., indicated as a TBTT) for each STA mentioned in the identifier. |
| Traffic identifier(s) | An information item to indicate which traffic stream this information corresponds to. E.g., TID. |
| Measurement metrics | The metrics that the STA needs to report. For example, this can be a bitmap in which each bit can correspond to a metric and AP can set the bits corresponding to required metric to 1 if it is requesting a report for those metrics otherwise 0. |
| Measurement procedure | The measurement procedure that the STA can use for measuring the metrics |

The above information can be transmitted by the AP to the STA in an independent frame or in any of the frame in the standard (e.g., beacon frames).

According to another embodiment, the STA can transmit an assistance indicator to the AP to report assistance with latency reduction. For instance, this can be a bit in a frame transmitted by the STA to the AP which can be set to 1 when the STA faces a high delay and set to 0 when the STA faces a low delay. When the AP receives such a frame with the indicator bit set to 1, the AP can take actions to reduce the STA's latency—e.g., triggering on the uplink.

Upon receiving the uplink latency report from the STA, the AP can take actions to reduce the STA side delay.

Figure 20:
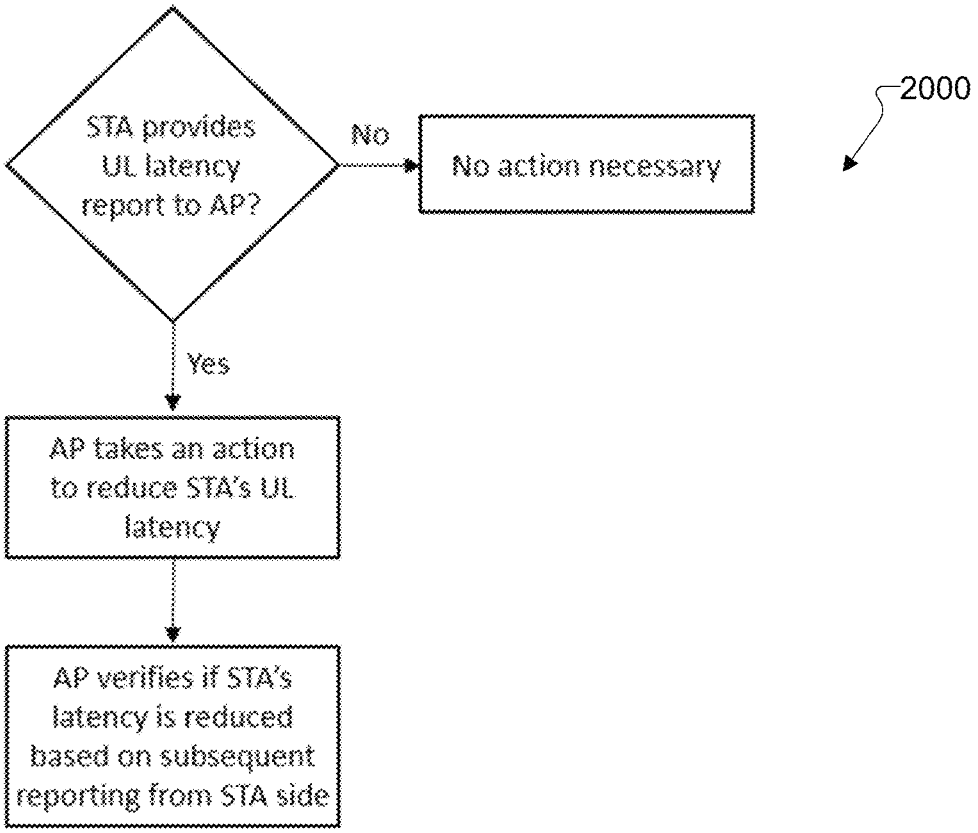
FIG. 20 illustrates an example procedure performed by an AP for taking action to reduce the STA side delay in response to an uplink latency report provided by the STA according to embodiments of the present disclosure.

FIG. 20 illustrates an example procedure 2000 performed by an AP for taking action to reduce the STA side delay in response to an uplink latency report provided by the STA according to embodiments of the present disclosure. The action taken can depend on the statistics and causes reported by the STA. Some example actions from the AP side are as listed in Table 11.

TABLE 11

| Uplink latency assessment | Cause assessment | Example AP-side action(s) |
|---|---|---|
| High uplink latency | 1. Due to high defer delay<br>1.a High defer delay is caused by same BSS large DL PPDU transmission | AP can initiate preemption procedure when transmitting large PPDUs |
| Low uplink latency | — | No AP side action needed |

TABLE 11-continued

| Uplink latency assessment | Cause assessment | Example AP-side action(s) |
|---|---|---|
| High uplink latency | 1. High retransmission rate<br>1.a High retransmission rate is caused by interference from same BSS | Prioritize the reporting STA for UL trigger based transmission |
| High uplink latency | 1. High retransmission rate<br>1.a High retransmission rate is caused by interference from neighboring BSS | Multi-AP coordination with the AP from the neighboring BSS to avoid interference to the STA from neighboring BSS transmissions |

According to another embodiment, in the case of MLO, the above information can be requested by an AP MLD from a non-AP MLD on any of the links that are setup between the AP MLD and the non-AP MLD. According to this embodiment, the information can be requested for statistics on any of the links that are setup between the AP MLD and the non-AP MLD.

Figure 21:
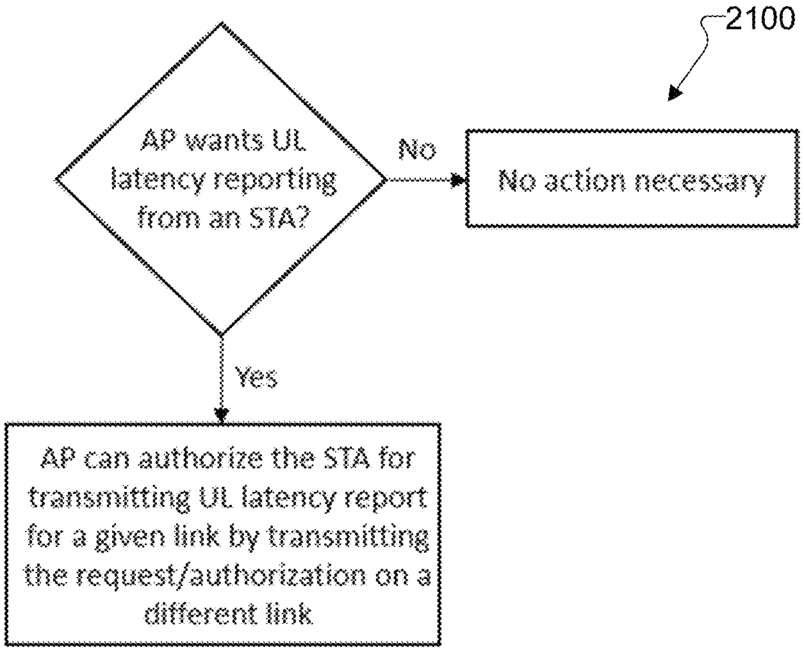
FIG. 21 illustrates an example procedure performed by an AP MLD for cross link request/authorization of uplink latency reporting by a non-AP MLD according to embodiments of the present disclosure.

FIG. 21 illustrates an example procedure 2100 performed by an AP MLD for cross link request/authorization of uplink latency reporting by a non-AP MLD according to embodiments of the present disclosure. The non-AP MLD may be, for example, one of non-AP MLDs 111-114. For convenience of disclosure, it is understood that references to a non-AP MLD in further embodiments of the present disclosure refer to one of non-AP MLDs 111-114. The AP MLD may be, for example, one of AP MLDs 101 or 103. For convenience of disclosure, it is understood that references to an AP MLD in further embodiments of the present disclosure refer to one of AP MLDs 101 or 103.

Considering the case in which an AP MLD has two APs affiliated with it—AP1 and AP2—and has an associated non-AP MLD with two non-AP STAs affiliated with it—STA1 and STA2—and the AP MLD and the non-AP MLD have two links setup—link1 and link2—the AP MLD can request the report from STA2 of the non-AP MLD for link2 by transmitting the request on link1 via AP1 to STA1. It is understood that embodiments of the present disclosure may be performed with an AP MLD having any appropriate number of affiliated APs or a non-AP MLD having any appropriate number of affiliated non-AP STAs.

According to another embodiment, the above information can be transmitted by the non-AP MLD to the AP MLD on any of the links that are setup between the AP MLD and the non-AP MLD.

Figure 22:
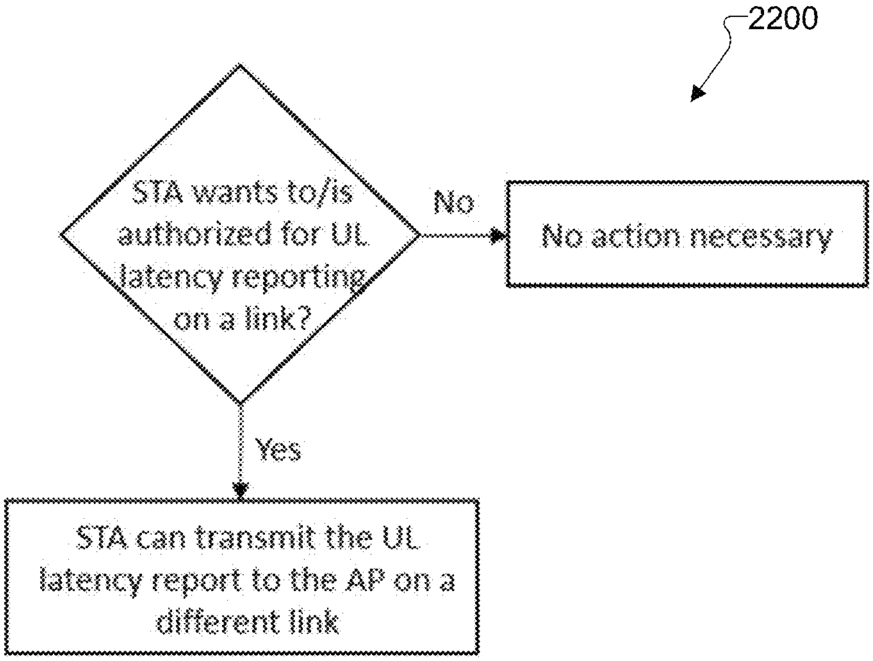
FIG. 22 illustrates an example procedure performed by a non-AP MLD for cross link uplink latency reporting to an AP MLD according to embodiments of the present disclosure.

FIG. 22 illustrates an example procedure 2200 performed by a non-AP MLD for cross link uplink latency reporting to an AP MLD according to embodiments of the present disclosure. According to this embodiment, the information can be reported for statistics on any of the links that are setup between the AP MLD and the non-AP MLD. Considering the scenario discussed with respect to FIG. 21, the non-AP MLD can report statistics for STA2 on link2 by sending the information to AP1 via STA1 on link1.

When such cross link reporting occurs, a link identifier can be included along with the information in the report. The link identifier can indicate which link the information corresponds to, e.g., the link identifier can be a link ID or a link ID bitmap if the information is being reported for multiple links. When a link ID bitmap is used, the bits corresponding to the links for which the information is being reported can be set to 1.

According to one embodiment, an AP that supports such a STA-side reporting procedure can advertise its capability to the STA in one or more frames that it transmits to the STA. Further, according to this embodiment, the STA that receives such a frame can understand that the AP supports such a capability.

Figure 23:
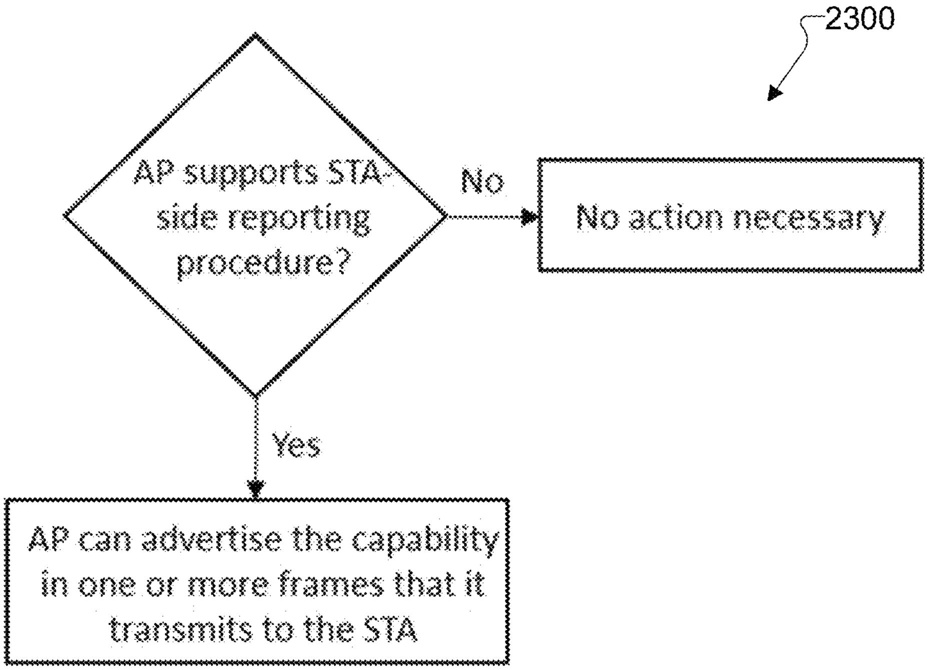
FIG. 23 illustrates an example procedure performed by an AP for advertising its capability to support STA-side uplink latency reporting according to embodiments of the present disclosure.

FIG. 23 illustrates an example procedure 2300 performed by an AP for advertising its capability to support STA-side uplink latency reporting according to embodiments of the present disclosure. The AP can advertise its capability in an independent frame or in any of the frames that it transmits to the STA (e.g., management frame such as beacons).

Likewise, a STA that supports such uplink latency reporting can advertise its capability to the AP in one or more frames that it transmits to the AP. When an AP receives such a frame it can understand that the STA supports such a capability.

Figure 24:
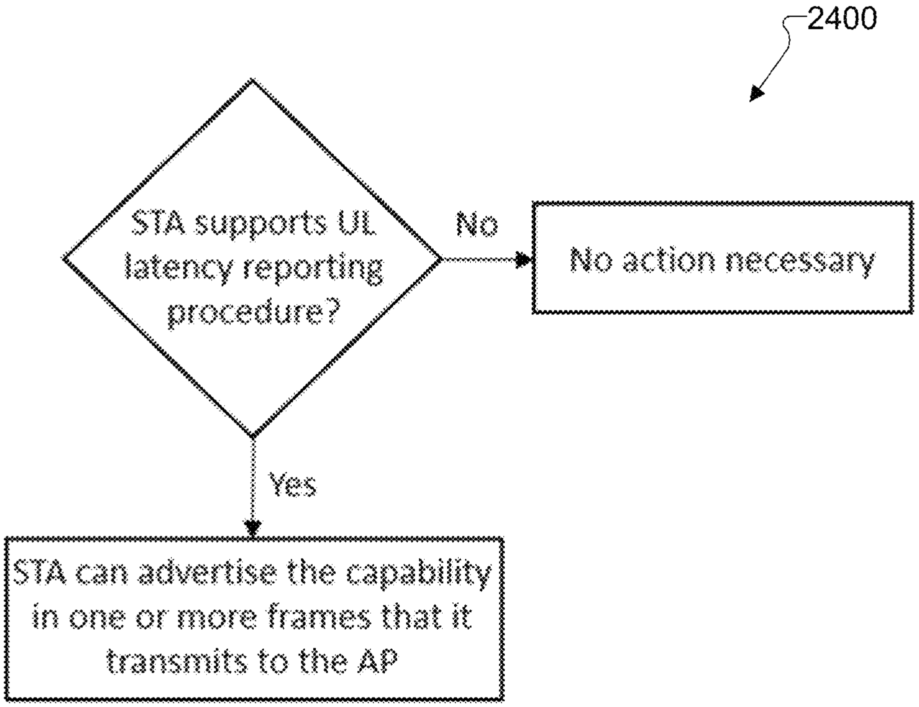
FIG. 24 illustrates an example procedure performed by a STA for advertising its capability to support STA-side uplink latency reporting according to embodiments of the present disclosure.

FIG. 24 illustrates an example procedure 2400 performed by a STA for advertising its capability to support STA-side uplink latency reporting according to embodiments of the present disclosure. The STA can advertise its capability in an independent frame or in any of the frame that it transmits to the AP (e.g., management frame such as probe response frames).

The traffic stream that a STA has can be broadly divided into two categories: periodic traffic and aperiodic traffic. Periodic traffic is characterized by packet arrival that is periodic or predictable. An AP can understand when a STA can have a backlog if it knows the traffic characteristics such as periodicity, burst length, etc., in advance. Aperiodic traffic is characterized by packet arrival that is event based or unpredictable. The AP cannot assess if the STA has a backlog or not on its own in this case. Thus, the STA can have a backlog at any time and the AP may not be aware of it.

Current methods of traffic information reporting have a few limitations. For MLO, since the frameworks for traffic information reporting were designed pre-11be, the reporting is done one a per-link basis and on the same link that the information corresponds to. Cross link support is not available. The reporting is also done on a per-TID (traffic identifier) basis in current traffic information reporting frameworks—to support enhancements for reporting and meeting QoS requirements, a stream ID is introduced in next generation WI-FI, however, there is no notion of stream ID in the current traffic information reporting frameworks.

These limitations can lead to inefficiency in new features introduced in next generation WI-FI networks. For example, under AP-side power saving, an AP affiliated with an AP MLD could benefit from knowledge of whether the STAs have backlog on a given link prior to coming to doze state. Since reporting can only be done on the same link, however, the current methods do not facilitate this.

As another example, to allow low latency traffic to be transmitted in uplink/downlink in an ongoing TXOP (e.g., during preemption), AP-side knowledge of STA-side traffic backlog and which stream the backlog belongs to could enable the AP to serve uplink traffic in an efficient manner by scheduling time/frequency resources. However, current methods can limit the AP to collect (or limit the STA side to report) the information inside the ongoing TXOP itself, thereby wasting already limited TXOP time. This can be inefficient if the STA side traffic is aperiodic LL traffic.

As yet another example, if a STA would like to be scheduled for uplink transmission via triggered TXOP sharing after the TXOP has started (e.g., due to arrival of aperiodic LL traffic), the STA cannot notify the AP of such an arrival unless the TXOP belongs to it or it is polled by the AP via, for instance, a buffer status report poll (BSRP). However, since the STA's traffic is aperiodic the AP may not know about the traffic arrival, and polling each STA in a TXOP can be inefficient, leading to resource wastage.

These inefficiencies can impact ultra-low latency application support in next generation WI-FI networks. Thus, a faster and cross-link oriented traffic statistics reporting protocol could benefit new features being considered in UHR. Accordingly, the present disclosure provides a number of procedures that facilitate traffic information reporting to address the above issues. For example, various procedures and signaling for traffic information reporting are provided, as well as various procedures and signaling for traffic information requesting, negotiation handling, and capability advertisement.

According to one embodiment, traffic information can be reported in a cross link manner—i.e., the information corresponding to one link can be reported on a different link. The report can contain one or more of the information items as indicated in Table 12.

TABLE 12

| Information item | Description |
|---|---|
| Stream information | An information item that indicates the stream that the reported information corresponds to. For instance, this can be indicated via the stream ID such as SCS ID. |

TABLE 12-continued

| Information item | Description |
| --- | --- |
| Packet arrival timing information | An information item that can describe the stream's timing information. E.g., delay timer, packet arrival pattern(s), enqueue timestamp, etc. |
| Link information | An information item that can describe the link that the reported information corresponds to. E.g., Link ID. |
| Traffic class | An information item that can indicate the details of the classes of traffic that the backlog belongs to. E.g., if there are frames belonging to LAS traffic category then an indication can be made. Another example if the traffic belongs to EPCS application. Other example can be based on access categories, TIDs, etc. |
| Airtime consumption information | An information item that describes the airtime consumption for transmitting the reported backlog. E.g., this can be the amount of time that the transmitter can require to transmit the frames based on the MCS, frame size, etc. |

The above information items can be carried in a single frame or in multiple frames. One or more of the above information items can be carried in newly defined frames or in existing frames in the standard. The report can be generated upon request or in an unsolicited manner (e.g., to aid the recipient of the report with some decision making). Some examples are as follows:

According to one example, the above information of Table 12 can be reported in a control subfield variant of an A-control subfield.

Figures 25, 26:
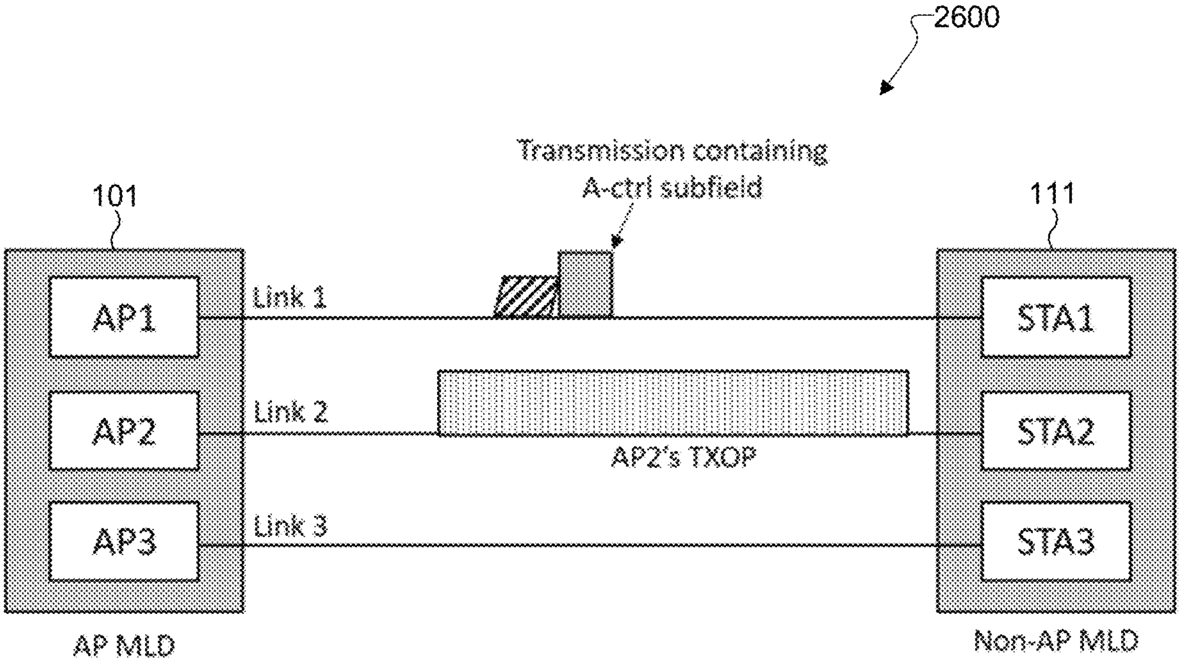
FIG. 25 illustrates an example frame format of a control subfield variant of an A-control subfield according to embodiments of the present disclosure.
FIG. 26 illustrates an example operation using the above A-control subfield according to embodiments of the present disclosure.

FIG. 25 illustrates an example frame format 2500 of a control subfield variant of an A-control subfield according to embodiments of the present disclosure. The Stream info subfield can indicate the stream identifier that the reported information belongs to (e.g., SCSID). There can be a reserved value for this field (e.g., a value of 0) when it is not being used. Alternatively, the transmitter can insert an invalid stream info in this field. When the receiver receives the A-control field with an invalid stream info, it can understand that the field is not being used.

The ACI Bitmap subfield can indicate the ACs for which the report is being generated. Each bit in the ACI bitmap can correspond to one AC. For instance, bit 0 can correspond to AC_BE, bit 1 can correspond to AC_BK, bit 2 can correspond to AC_VI and bit 3 can correspond to AC_VO.

The Scaling Factor subfield can indicate the unit SF, in octets, of the Queue Size All subfield. An example encoding for the scaling factor subfield can be as shown in Table 13 below.

TABLE 13

| Scaling factor subfield | Scaling factor, SF, in octets |
| --- | --- |
| 0 | 16 |
| 1 | 256 |
| 2 | 2048 |
| 3 | 32768 |

The Queue Size All subfield can indicate the amount of buffered traffic, in units of SF octets, for the ACs identified by the ACI Bitmap subfield. The Link ID subfield can indicate the link to which this information corresponds.

FIG. 26 illustrates an example operation 2600 using the above A-control subfield according to embodiments of the present disclosure. As illustrated in FIG. 26, AP2 has acquired a TXOP on link 2 and is transmitting data. STA2 would like to be assigned a portion of AP2's TXOP (e.g., via preemption, triggered TXOP sharing, etc.) as it has a frame or frames corresponding to an ultra-low latency application. However, since AP2 is transmitting, STA2 cannot communicate its traffic information on link 2. Instead, STA1 can transmit an A-ctrl subfield to AP1 on link 1 (either in an ongoing transmission or in a QoS Null Frame) containing information on the stream for which frames are queued at STA2. Upon receiving the information at AP1, the AP MLD can pass the information internally to AP2. AP2 can then take an action based on the information (e.g., allocating a portion of its TXOP to STA2 on link 2 or triggering STA2 for transmission on the uplink on link2).

According to another example, the traffic information of Table 12 can be reported in a new control frame.

Figure 27:
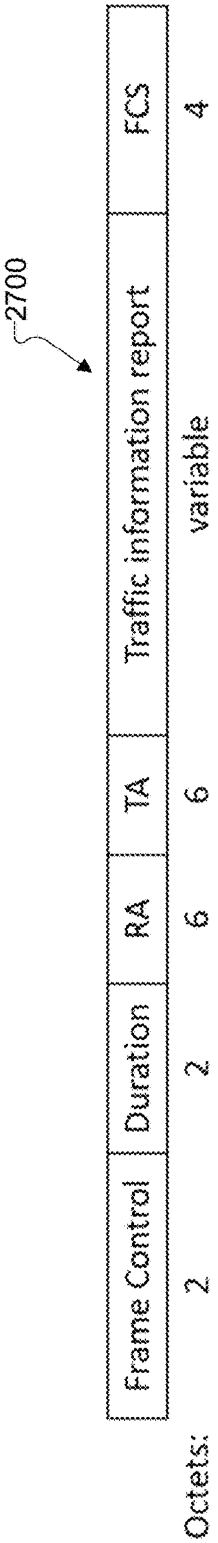
FIG. 27 illustrates an example frame format of a control frame according to embodiments of the present disclosure.

FIG. 27 illustrates an example frame format 2700 of a control frame according to embodiments of the present disclosure. The control frame can contain a traffic information report for each stream identifier, referred to herein as a per-stream report for ease of discussion.

Figure 28:
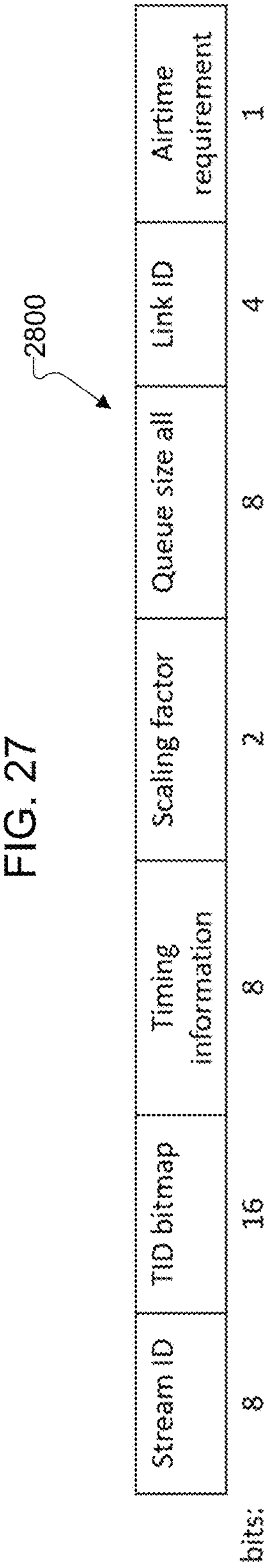
FIG. 28 illustrates an example format of a per-stream report according to embodiments of the present disclosure.

FIG. 28 illustrates an example format 2800 of a per-stream report according to embodiments of the present disclosure. The traffic information report using control frame 2700 can contain one or more of these per-stream reports 2800.

Referring to FIG. 28, the Stream ID subfield can identify the stream for which this information corresponds to (e.g., SCSID). The TID Bitmap subfield can indicate the TIDs for which the information is being reported. A value of 1 in the bit position i of this bitmap can indicate to the receiver that the transmitter is reporting traffic information for TID i in this traffic report. A value of 0 in bit position i of this bitmap can indicate to the receiver that the transmitter is no reporting traffic information for TID i in this traffic report.

The Timing information subfield can indicate the timing information (e.g., enqueue time) for the most urgent frame in the queue that can belong to one of the TIDs indicated in the TID bitmap. Alternatively, the Timing information subfield can also indicate the delay timer of the most urgent frame. The most urgent frame can be the frame with the least delay timer or one whose delay bound can get exceeded first out of all the frames whose information is being reported in the report.

The Scaling factor subfield can indicate the unit SF, in octets, of the Queue Size All subfield. An example encoding for the scaling factor subfield can be as shown in Table 13 above.

The Queue Size All subfield can indicate the amount of buffered traffic, in units of SF octets, for the TIDs identified by the TID bitmap subfield. The Link ID subfield can indicate the link to which this information corresponds. The Airtime requirement subfield can indicate the amount of airtime that is needed for transmission of the reported backlog.

Figure 29:
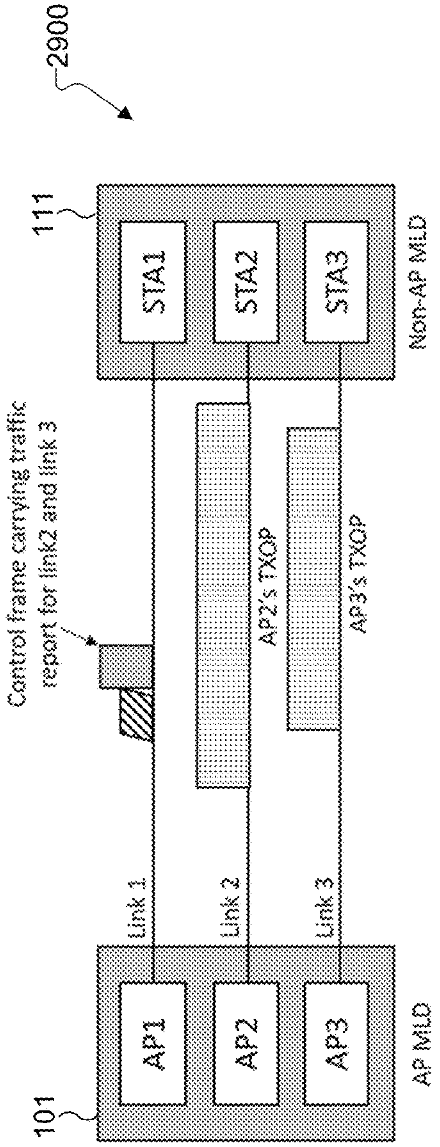
FIG. 29 illustrates an example operation using the above control frame according to embodiments of the present disclosure.

FIG. 29 illustrates an example operation 2900 using the above control frame according to embodiments of the present disclosure. As illustrated in FIG. 29, AP2 has acquired a TXOP on link 2 and is transmitting data. AP3 has acquired a TXOP on link 3 and is transmitting data. STA2 would like to be assigned a portion of AP2's TXOP (e.g., via preemption, triggered TXOP sharing, etc.) as it has frames corresponding to an ultra-low latency application. Similarly, STA3 would like to be assigned a portion of AP3's TXOP as it has frames corresponding to an ultra-low latency application.

However, since AP2 and AP3 are transmitting, STA2 and STA3 cannot communicate their traffic information on link 2 and link 3, respectively. Instead, STA1 can transmit the above control frame of FIG. 27 on link 1, containing reports for STA2 on link 2 and STA3 on link 3. Upon receiving the information at AP1, the AP MLD can pass the information internally to AP2 and AP3. AP2 and AP3 can then take action based on the information (e.g., allocating a portion of their TXOPs to STA2 on link 2 and STA3 on link 3, respectively, or triggering STA2 and STA3 for transmission on the uplink on link 2 and link 3, respectively).

According to another example, the traffic information of Table 12 can be reported in a newly defined element.

Figures 30, 31, 32:
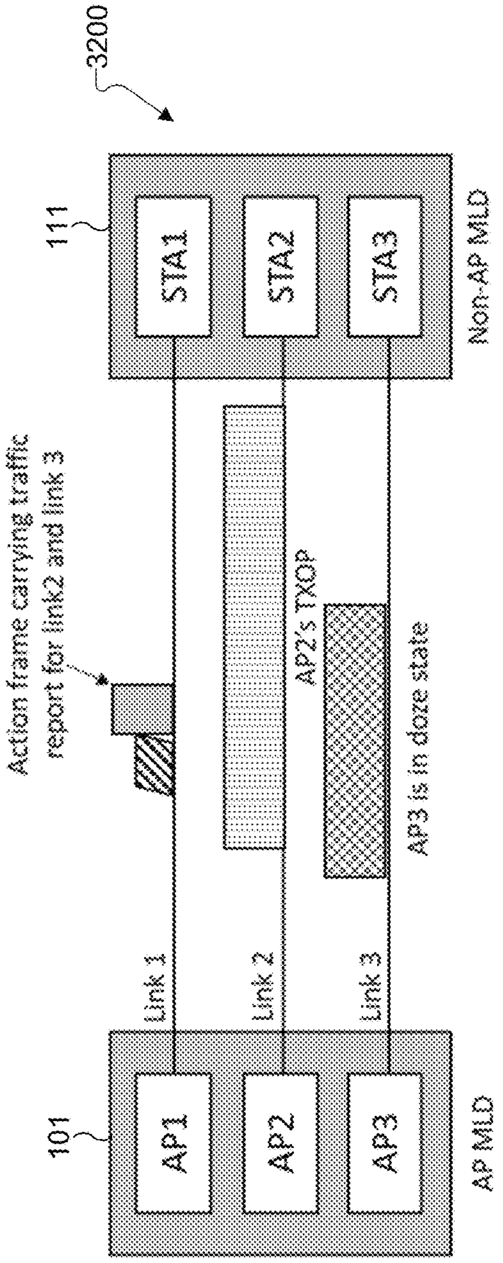
FIG. 30 illustrates an example element format of a new element according to embodiments of the present disclosure.
FIG. 31 illustrates an example format of a per-stream report according to embodiments of the present disclosure.
FIG. 32 illustrates an example operation using the above new element according to embodiments of the present disclosure.

FIG. 30 illustrates an example element format 3000 of a new element according to embodiments of the present disclosure. The new element of FIG. 30 can contain a per-stream report list which can contain one or more per-stream reports.

FIG. 31 illustrates an example format 3100 of a per-stream report according to embodiments of the present disclosure. Each per-stream report in the new element of FIG. 30 can have the format 3100.

Referring to FIG. 31, the Stream information subfield can indicate the information about the stream (e.g., SCSID). The Scaling factor subfield can indicate the unit SF, in octets, of the Queue size all subfield. An example encoding for the scaling factor subfield can be as shown in Table 13 above. The Queue size all subfield can indicate the amount of buffered traffic, in units of SF octets, for the TIDs identified by the TID bitmap subfield. The Link ID subfield can indicate the link to which the reported information corresponds.

The ACI Bitmap subfield can indicate the ACs for which the report is being generated. Each bit in the ACI bitmap can correspond to one AC. For instance, bit 0 can correspond to AC_BE, bit 1 can correspond to AC_BK, bit 2 can correspond to AC_VI and bit 3 can correspond to AC_VO.

The Timing info list subfield can provide the timing information about the traffic stream. For instance, this can be the timing information (e.g., enqueue timestamps) of the head of the line packets for each of the ACs that are indicated in the ACI bitmap. In another example, this can be timing information that can describe the arrival pattern of the traffic stream.

The Airtime requirement subfield can provide the amount of airtime needed to transmit the indicated information.

The LAS presence indicator subfield can indicate if there are any LAS packets in the indicated backlog. In one example, this can be a bit set to 1 to indicate that there are LAS packets backlogged at the STA. In another example, this can be a bit map wherein each bit can indicate the AC queue in which the LAS packet is enqueued. For instance, if in the ACI bitmap bit 2 is set to 1 and in the LAS presence indicator field bit 2 is set to 1, this can indicate that there is an LAS packet queued in the AC_VI queue.

FIG. 32 illustrates an example operation 3200 using the above new element according to embodiments of the present disclosure. As illustrated in FIG. 32, AP2 has the TXOP on link 2 and AP3 is in doze state. In this scenario, if STA2 and STA3 want to transmit traffic reports to their respective APs (e.g., if a packet arrives at STA2 after AP2 has captured the TXOP and started its transmission and a packet arrives at STA3 after AP3 has gone into doze state) then STA2 may want to get some of AP2's TXOP allocated to it on link 2 and STA3 may want AP3 to come out of doze state so it can transmit the frame.

In this example, STA1 can transmit a report to AP1 carrying a per-stream report list with reports for link 2 and link 3, and the respective APs (AP2 and AP3) can then act upon that information. For instance, AP2 can allocate a portion of its acquired TXOP to STA2 and AP3 can come out of doze state and trigger STA3 for uplink transmission.

According to another example, the traffic information of Table 12 can be reported in a newly defined acknowledgement frame (e.g., Block ACK).

Figures 33, 34:
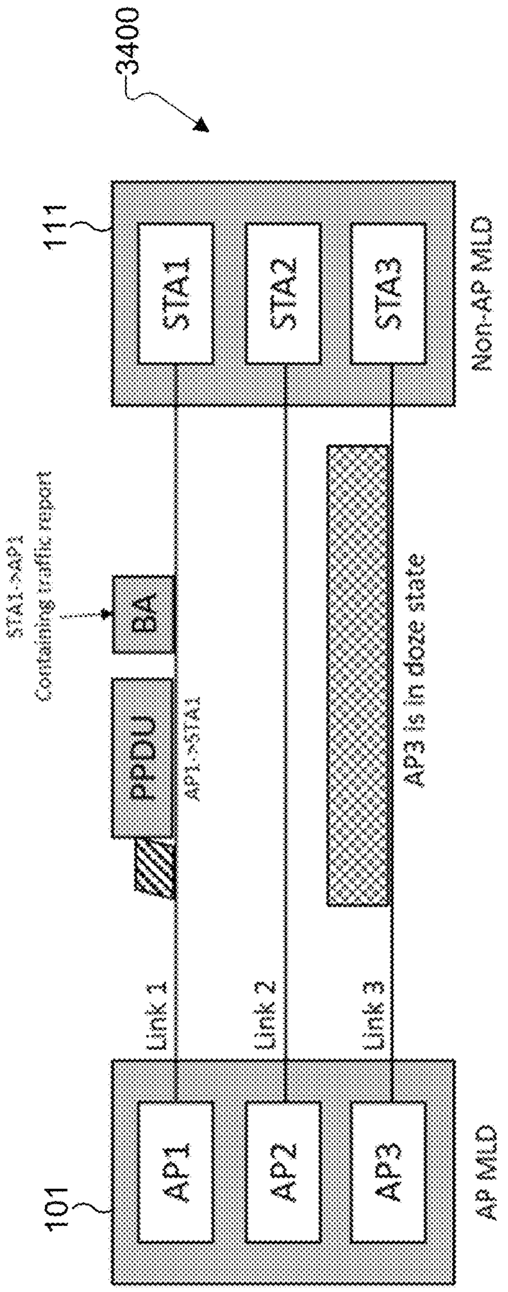
FIG. 33 illustrates an example format of a new Block ACK frame carrying a traffic report according to embodiments of the present disclosure.
FIG. 34 illustrates an example operation using the above new Block ACK according to embodiments of the present disclosure.

FIG. 33 illustrates an example format 3300 of a new Block ACK frame carrying a traffic report according to embodiments of the present disclosure. The new Block ACK of FIG. 33 includes a traffic report subfield which can include a combination of any of the fields described in the examples of FIGS. 25, 28, and 31.

FIG. 34 illustrates an example operation 3400 using the above new Block ACK according to embodiments of the present disclosure. As illustrated in FIG. 33, AP3 is in doze state. In this scenario, if STA3 wants to send a traffic report to AP3 so that AP3 can come out of doze state and serve STA3, then STA1 can include the traffic report in a BA (Block ACK) that it transmits to AP1 as a part of its ongoing transmission. This report can be internally passed to AP3 by the AP MLD, and AP3 can then act upon it, e.g., by coming out of doze state to trigger STA3 on the uplink.

Another example of reporting can be based on a measurement response frame which can include one or more of the fields described previously.

According to one embodiment, information on traffic can be reported upon a request by one entity (e.g., an AP MLD). The request frame can contain one or more of the information items as indicated in Table 14.

TABLE 14

| Information item | Description |
|---|---|
| Stream information | An information item that indicates the stream that the information is being requested for. For instance, this can be indicated via the stream ID such as SCS ID. |
| Requested information details | An information item that can describe the type of information that are being requested. E.g., this can be a bitmap in which each bit correspond to a particular type of information and only requested information can |

TABLE 14-continued

| Information item | Description |
|---|---|
| | be sent by the reporting entity (e.g., the non-AP MLD). This can enable to reduce the size of the reports by containing the minimum amount of information necessary. |
| Link information | An information item that can describe the link(s) on which the information can be reported. |
| Traffic class | An information item that can indicate the details of the classes of traffic that the information is being requested for. E.g., if the request is for backlog corresponding to LAS traffic category then an indication can be made. Another example if the request is for traffic that belongs to EPCS application, another examples can be if the request is for traffic that belongs to an access category, another example can be if the request is for traffic that belongs to a particular TID, etc. |
| Timing information | An information item that indicates that the timing information is being requested by the requesting entity. |

The above information items can be carried in a single frame or in multiple frames. One or more of the above information items can be carried in newly defined frames or in existing frames in the standard. Some examples are as follows:

According to one example, the above information of Table 14 can be requested in a control subfield variant of an A-control subfield.

Figure 35:
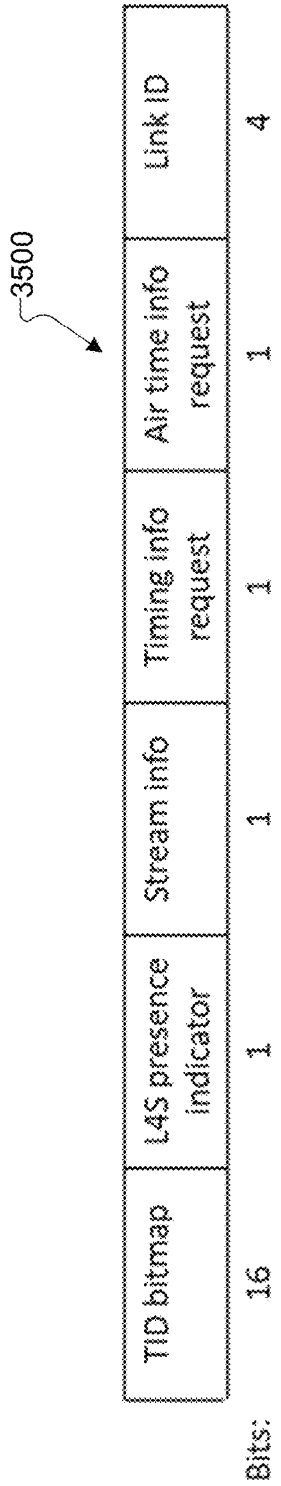
FIG. 35 illustrates an example frame format of a control subfield variant of an A-control subfield according to embodiments of the present disclosure.

FIG. 35 illustrates an example frame format 3500 of a control subfield variant of an A-control subfield according to embodiments of the present disclosure. The TID bitmap subfield can indicate the TIDs for which the report is being requested. A value of 1 in the bit position i of this bitmap can indicate to the receiver that the requesting entity is requesting a report for frames belonging to TID i in the report from the STA and a value of 0 can indicate that the requesting entity is not requesting a report for frames belonging to TID i.

The LAS presence indicator can be set to 1 to indicate if the requesting entity wants to know if there are any packets belonging to the L4S category backlogged at the STA side. The Timing info request subfield can be set to 1 to indicate that the requesting entity is requesting for the timing information from the responding entity in the report. It can be set to 0 otherwise. The Air time info request subfield can be set to 1 to indicate that the requesting entity is requesting for airtime information from the responding entity. The Link ID field can indicate the link (or in other words the corresponding STA operating on the indicated link for the MLD) for which the report is being requested.

Figure 36:
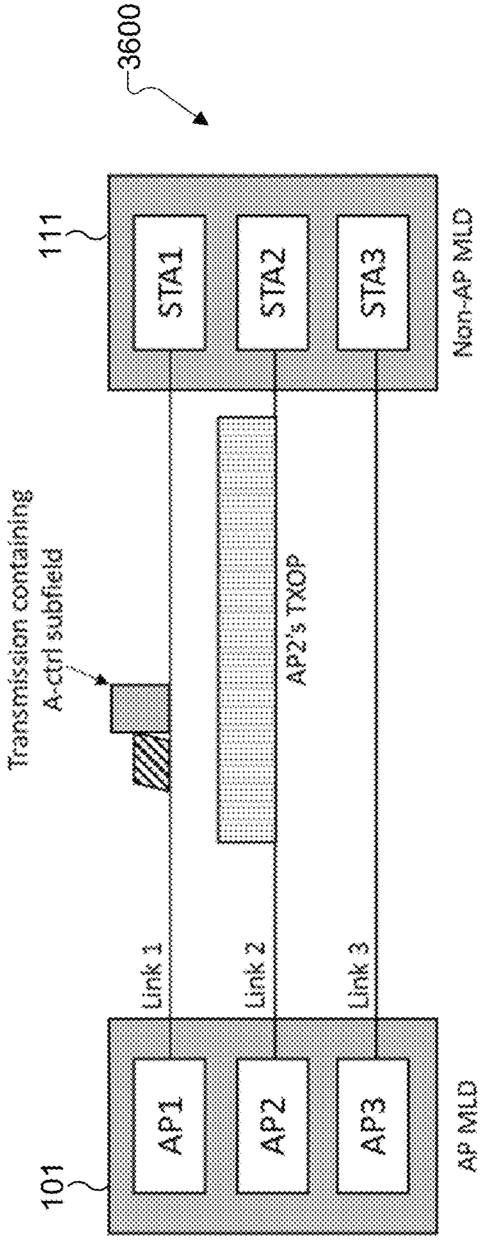
FIG. 36 illustrates an example operation using the above A-control subfield according to embodiments of the present disclosure.

FIG. 36 illustrates an example operation 3600 using the above A-control subfield according to embodiments of the present disclosure. As illustrated in FIG. 36, AP2 has captured the TXOP on link 2. In this example, AP2 wants to allocate a portion of its acquired TXOP to STA2 but does not know if STA2 has the backlog or the necessary urgency. Ahead of time, before the portion of the TXOP becomes available, AP1 can transmit an A-control subfield (either in an ongoing transmission or as a QoS Null frame) to request a traffic report for STA2. Upon receiving the traffic report for STA2, AP2 can make a decision.

According to another example, the above information of Table 14 can be requested in a new control frame.

Figures 37, 38, 39:
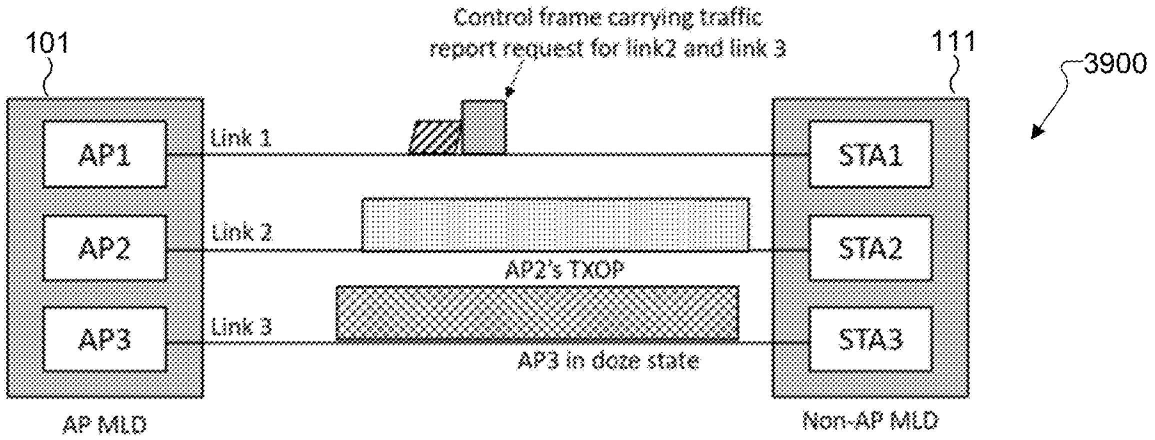
FIG. 37 illustrates an example frame format of a control frame for a traffic information request according to embodiments of the present disclosure.
FIG. 38 illustrates an example format of a traffic information request according to embodiments of the present disclosure.
FIG. 39 illustrates an example operation using the above control frame to request a traffic report according to embodiments of the present disclosure.

FIG. 37 illustrates an example frame format 3700 of a control frame for a traffic information request according to embodiments of the present disclosure. As illustrated in FIG. 37, the control frame can contain a traffic information request list field, which can contain one or more traffic information requests.

FIG. 38 illustrates an example format 3800 of a traffic information request according to embodiments of the present disclosure. Each traffic information request in the traffic information request list field of the control frame of FIG. 37 can have the format 3800.

Referring to FIG. 38, the Stream info subfield can indicate if the requesting entity is making a request corresponding to a particular stream. The TID bitmap subfield can indicate the TIDs for which the report is being requested. A value of 1 in the bit position i of this bitmap can indicate to the receiver that the requesting entity is requesting a report for frames belonging to TID i in the report from the STA and a value of 0 can indicate that the requesting entity is not requesting a report for frames belonging to TID i.

The Timing information request subfield can be set to 1 to indicate that the timing information is being requested in the report. The Link ID subfield can indicate the link (or in other words the corresponding STA operating on the indicated link for the MLD) for which the report is being requested. The Airtime requirement subfield (or Airtime info request subfield) can be set to 1 to indicate that the requesting entity is requesting for airtime information from the responding entity. The LAS presence indicator can be set to 1 to indicate if the requesting entity wants to know if there are any packets belonging to the LAS category backlogged at the STA side.

FIG. 39 illustrates an example operation 3900 using the above control frame to request a traffic report according to embodiments of the present disclosure. As illustrated in FIG. 39, AP2 has captured the TXOP on link 2 and AP3 is in doze state. In this example, AP2 and AP3 want to request for reports from STA2 and STA3 respectively ahead of time (e.g., AP2 wants to know traffic information of STA2 ahead of time before it allocates a portion of TXOP to STA2 and AP3 wants to know traffic information of STA3 ahead of time before it transitions out of doze state). To accomplish this, AP1 can transmit a control frame to STA1 carrying the two traffic report requests.

According to another example, the above information of Table 14 can be requested in a newly defined element.

Figure 40:
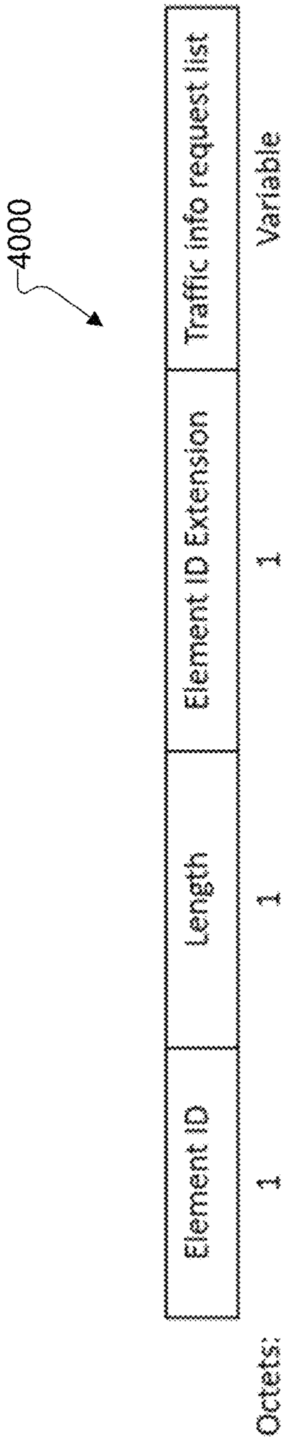
FIG. 40 illustrates an example format of a new element for a traffic information request according to embodiments of the present disclosure.

FIG. 40 illustrates an example format 4000 of a new element for a traffic information request according to embodiments of the present disclosure. As illustrated in FIG. 40, the new element can contain a traffic information request list field, which can contain one or more traffic information requests. These traffic information requests may have the format 3800 of FIG. 38. Moreover, operations using the new element can be similar to operation 3900 of FIG. 39, with an action frame carrying the new element of FIG. 40 instead of the control frame of FIG. 37.

According to another example, the above information of Table 14 can be requested in a modified acknowledgement frame (e.g., Block ACK).

Figure 41:
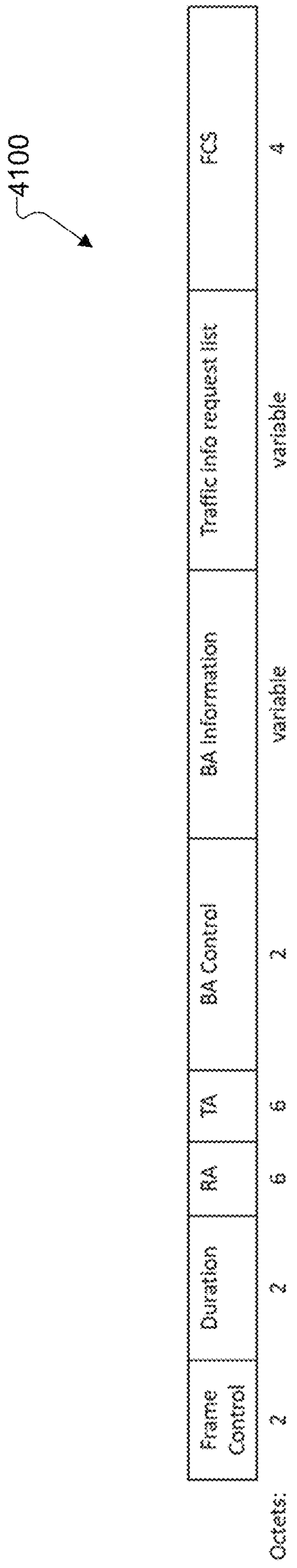
FIG. 41 illustrates an example format of a modified Block ACK carrying a traffic information request according to embodiments of the present disclosure.

FIG. 41 illustrates an example format 4100 of a modified Block ACK carrying a traffic information request according to embodiments of the present disclosure. The modified Block ACK of FIG. 41 includes a Traffic info request list field, which can contain one or more traffic information requests. These traffic information requests may have the format 3800 of FIG. 38.

According to one example, the above information can be requested in a modified buffer status report poll (BSRP).

According to one embodiment, there can be a negotiation procedure between the requesting entity and the responding entity. According to this embodiment, any one of the entities can transmit a negotiation request frame to the other entity. Upon receiving the negotiation request frame, the other entity can process the request and transmit a response frame if the request is acceptable. The request frame can contain one or more of the information items as indicated in Table 15.

TABLE 15

| Information item | Description |
|---|---|
| Negotiation request indication | An information item that can provide an indication that the entity is transmitting this frame as a negotiation request. E.g., a reason code. |
| Negotiation request identifier | An information item that can serve as an identifier for the negotiation request. E.g., a dialog token. The same can be carried in the corresponding negotiation response. |
| Reporting link indication | An information item that can provide an indication of the link(s) on which the reporting can be done or is being requested to be done. E.g., a link ID list or a link ID bitmap. Alternatively, this can also indicate the affiliated STAs for which the reporting can be done. |
| Traffic identifier indication | An information item that can provide an indication of the traffic identifiers for which the reporting can be done or is being requested to be done. E.g., list of TIDs, TID bitmap. |
| Stream identifier indication | An information item that can provide an indication of the stream(s) for which the reporting can be done or is being requested to be done. E.g., SCS ID list. |

The above information items can be carried in a single frame or in multiple frames. One or more of the above information items can be carried in newly defined frames or in existing frames in the standard.

The negotiation response can contain one or more of the information item(s) as indicated in Table 16.

TABLE 16

| Information item | Description |
|---|---|
| Negotiation response indication | An information item that can provide an indication of the response of the responder. E.g., status code. |
| Negotiation request identifier | An information item that can indicate the negotiation request the response corresponds to. E.g., the same dialogue token that was present in the negotiation request. |
| Link indication | An information item that can provide an indication of the link(s) on which the reporting can be done. E.g., link ID list or link bitmap. Alternatively, this can also indicate the affiliated STAs for which the reporting can be done. |
| Stream identifier indication | An information item that can provide an indication of the streams for which the reporting can be done. E.g., SCS ID list. |

The above information items can be carried in a single frame or in multiple frames. One or more of the above information items can be carried in newly defined frames or in existing frames in the standard.

According to one embodiment, an MLD that supports the traffic stream information reporting capabilities described in this disclosure can advertise its support in one or more frames that it transmits. For instance, if the MLD is an AP MLD, then it can advertise its support in management frames such as beacons, probe responses, etc. If the MLD is a non-AP MLD, then it can advertise its support in management frames such as probe requests, (Re) association requests, etc.

The above report requests and responses can occur between any two entities. E.g., the requesting entity can be an AP MLD and the responding entity can be a non-AP MLD as in the above examples. In another example, the requesting entity can be a peer and the responding entity can be a peer. In another example, the requesting entity can be an AP MLD and the responding entity can be an AP MLD as well. The requesting entity can be a non-AP MLD and the responding entity can be an AP MLD.

The fields described in the examples in this disclosure are not limited to the frames, elements, etc. in the context in which they have been described. They can be a part of any frames, elements, etc. in the standard specifications, or newly defined ones as well. Additionally, in each of the examples described above, one or more of the fields/sub-fields can be absent. Moreover, one or more extra fields not discussed in this disclosure can be present. The TID bitmaps indicated in this disclosure can either be 8 bits or 16 bits.

QoS requirements of a traffic stream are specified during SCS setup and are referenced with an SCSID based on the SCS request and response frames. However, treatment of traffic is done based on access category (AC)/TID which may not provide a good differentiation and QoS requirement fulfillment. This can be inefficient and may not lead to a desired effect in many cases.

For example, a user can have a number of applications. Each application can generate packets of a number of different TIDs. Even if two packets belong to the same TID, their QoS requirements can be different as they can belong to two different traffic streams. If the AP MLD wants to map all traffic of a first traffic stream to a particular link (e.g., if the link has less congestion and can meet the QoS requirements of the first traffic stream), the current method of TID-to-link mapping can result in packets of other traffic streams getting mapped to that link (e.g., if the other traffic streams have some packets that belong to the same TIDs as the first traffic stream).

Furthermore, there can also be other types of traffic not covered by 802.11 currently (e.g., LAS) which can get mapped to an AC/TID that also has packets that do not belong to the same traffic type but fall under the same AC/TID.

Additionally, if an AP MLD wants to trigger packets of a first traffic stream to be able to meet its latency requirements, it can happen that the packets of another stream also get triggered as well if the other stream belongs to the same TIDs/AC as the first traffic stream. This can result in an undesired effect.

Procedures that can provide a treatment of traffic based on the stream that they belong to are important. Accordingly, the present disclosure provides a number of procedures that facilitate stream ID based traffic treatment to address the above issues. For example, various procedures and signaling for stream-to-link mapping are provided, including procedures and signaling for requests, responses, teardown, and capability advertisements related to stream-to-link mapping. Additionally, a stream based triggering procedure and related capability advertisement procedures and signaling are provided.

According to one embodiment, stream classification criteria can be explicitly specified by providing classifiers that can enable classification of packets that belong to a particular stream. For example, this can be done based on providing TCLAS (traffic classification) and TCLAS processing elements explicitly when referencing a particular stream.

According to another embodiment, stream classification criteria can be reused by referencing the SCSID that was assigned during SCS request and response procedure. The classification criteria based on the TCLAS and TCLAS processing elements that were providing during that SCS request and response procedures can be reused based on the SCSID referencing.

According to one embodiment, a stream-to-link mapping procedure can be performed. The end result of this procedure can be that the packets that belong to a particular stream can get mapped to specific links. To achieve this effect, a requester (e.g., a non-AP MLD) can send a request to a requestee (e.g., an AP MLD). The request can be in the form of one or more frames transmitted to the requestee. The frames can contain one or more of the information items as indicated in Table 17.

TABLE 17

| Information item | Description |
|---|---|
| Stream information | An information item that can provide indication of which traffic stream(s) that the requestor is referring to. |
| Link information | An information item that can provide indication of which link(s) the referenced traffic stream(s) are being requested to be mapped to. The above two can either be separate entities or the same entity that can provide information of both, i.e., an information item that can provide mapping of a stream to one or more link(s) or vice versa. |
| Timing information | An information item that can indicate the time at which the mapping is being requested to take effect. E.g., timing information as provided in reference to the TSF timer of the link. |
| Duration information | An information item that can indicate the requested duration for which the mapping can be expected to be effective. E.g., time duration in terms of TUs. |
| Traffic direction information | An information item that can indicate the direction of traffic for which the mapping is intended. E.g., if the traffic direction is downlink or uplink or to peer. |

The above information items can be transmitted in one or more frames. The above information items can be transmitted in newly defined frames or in any of the frames existing in the standard (e.g., A-control subfields, control frames, action frames, etc.). Some examples are as follows:

In one example, a newly defined element can carry the above stream-to-link mapping request information of Table 17.

Figure 42:
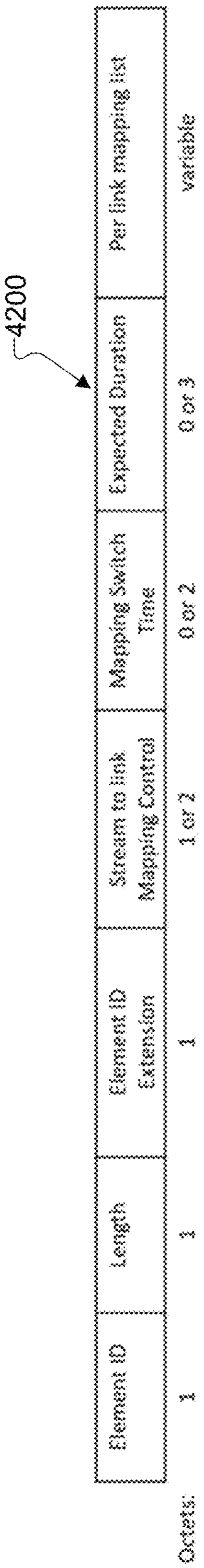
FIG. 42 illustrates an example format of a stream-to-link mapping element according to embodiments of the present disclosure.

FIG. 42 illustrates an example format 4200 of a stream-to-link mapping element according to embodiments of the present disclosure. The stream-to-link mapping element can include a Stream to link Mapping Control field.

Figure 43:
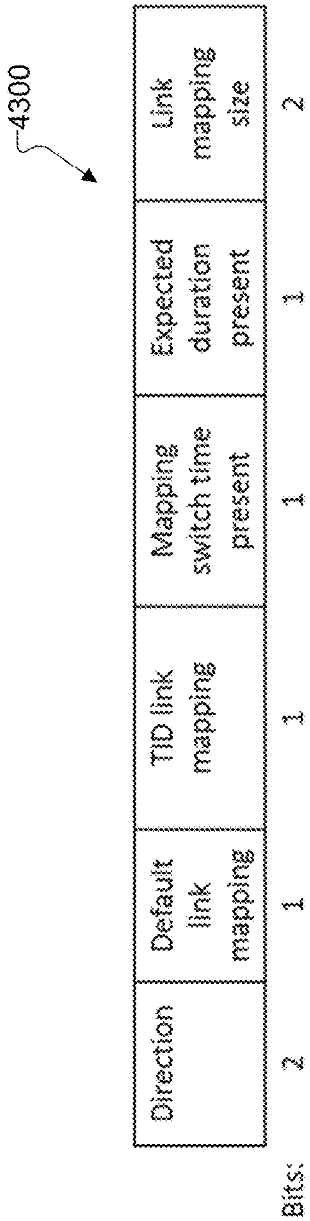
FIG. 43 illustrates an example format of a Stream to link Mapping Control field according to embodiments of the present disclosure.

FIG. 43 illustrates an example format 4300 of a Stream to link Mapping Control field according to embodiments of the present disclosure. The Direction subfield can be set to 0 if the stream-to-link mapping element provides the stream-to-link mapping information for frames transmitted in the downlink. It can be set to 1 if the stream-to-link mapping element provides the stream-to-link mapping information for frames transmitted on the uplink. It can be set to 2 if the stream-to-link mapping element provides the stream-to-link mapping information for frames transmitted both in the downlink and the uplink. It can be set to 3 to indicate that the stream-to-link mapping element provides the stream-to-link mapping information for frames that are transmitted to a peer.

The Default link mapping subfield can be set to 1 to indicate that the stream-to-link mapping element represents the default stream-to-link mapping. Otherwise, it can be set to 0. The TID link mapping subfield can be set to 1 to indicate that the mapping should follow the TID-to-link mapping instead of a new stream-to-link mapping. Otherwise, it can be set to 0. The Mapping switch time present subfield can be set to 1 to indicate that the Mapping Switch Time field is present. Otherwise, it can be set to 0. The Expected duration present subfield can be set to 1 to indicate that the expected duration field is present. Otherwise, it can be set to 0. The Link mapping size subfield can indicate the number of links for which stream-to-link mapping has been provided in the stream-to-link mapping element.

Referring again to the example format 4200 of the stream-to-link mapping element of FIG. 42, the Mapping Switch Time field can indicate the time at which the new stream-to-link mapping can be established. Absence of this field can indicate that the stream-to-link mapping has already been established at the time of reception of the element.

The Expected Duration field can indicate the duration for which the proposed stream-to-link mapping can be expected to be effective. The time can be indicated in units of TUs. When the Mapping Switch Time field is present, the Duration field can be from the duration starting from the time indicated by the Mapping Switch Time field. When this field is absent, the Duration field can indicate the remaining time for which the stream-to-link mapping can be expected to be effective.

The Per link mapping list field can include a list of stream to link mapping fields.

Figure 44:
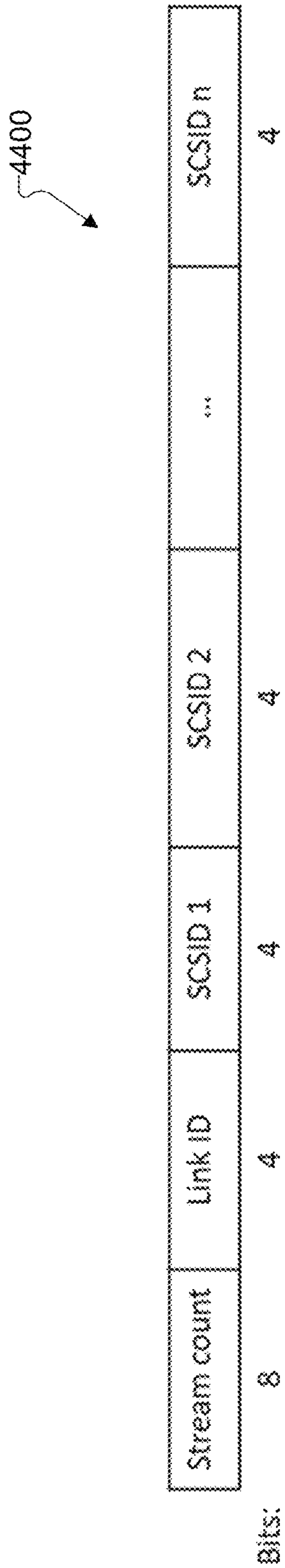
FIG. 44 illustrates an example format of a stream to link mapping field according to embodiments of the present disclosure.

FIG. 44 illustrates an example format 4400 of a stream to link mapping field according to embodiments of the present disclosure. Each stream to link mapping field included in the Per link mapping list field of FIG. 42 can have the format 4400. The Stream count subfield can indicate the number of stream identifiers (SCSIDs) that are present following the Link ID subfield. The Link ID subfield can indicate the link for which this information corresponds to. The SCSIDs following the Link ID subfield can indicate the SCSIDs that are mapped to this link.

The above information element can be present in management frames such as beacon, probe response frames, etc. when transmitted by the AP MLD to indicate the mapping to the non-AP MLD. When transmitted in beacons, there can be an additional field that can indicate which device the recipient of the element is.

The above information element can be present in management frames such as (Re) association request, probe requests frames, etc. when transmitted by the non-AP MLD to indicate the mapping request to the AP MLD.

In another example, a new action frame can carry the above stream-to-link mapping request information of Table 17. A stream-to-link mapping request action frame can have fields in the format of Table 18 below.

TABLE 18

| Order | Information |
|---|---|
| 1 | Category |
| 2 | Protected Action |
| 3 | Dialog Token |
| 4 | Stream to link mapping |

The category field indicates the category of the action frame. The protected action field can enable to differentiate the protected action frame formats. The dialog token can be a non-zero value that can be chosen by the transmitter of the frame to identify the request/response transaction. The stream to link mapping field can contain one or more stream-to-link mapping elements as described previously.

According to one embodiment, the request may not be negotiable—e.g., if the request is made by the AP MLD, the non-AP MLD can only accept it or deny the request. According to another embodiment, the request can be negotiable—e.g., if the request is made by the non-AP MLD, the AP MLD can respond with a response frame that can indicate the final configuration.

According to one embodiment, there can be a response procedure for the stream-to-link mapping request of the stream ID based traffic treatment. The response procedure can indicate to the requestor the response of the requestee. The response can contain one or more of the information items as indicated in Table 19.

TABLE 19

| Information item | Description |
|---|---|
| Stream information | An information item that can provide indication of which traffic stream(s) that the requestee is referring to. |
| Link information | An information item that can provide indication of which link(s) the referenced traffic stream(s) are being mapped to. The above two can either be separate entities or the same entity that can provide information of both, i.e., an information item that can provide mapping of a stream to one or more link(s) or vice versa. |

TABLE 19-continued

| Information item | Description |
|---|---|
| Timing information | An information item that can indicate the time at which the mapping can take effect. E.g., timing information as provided in reference to the TSF timer of the link. |
| Duration information | An information item that can indicate the duration for which the mapping can be expected to be effective. E.g., time duration in terms of TUs. |
| Traffic direction information | An information item that can indicate the direction of traffic for which the mapping is intended. E.g., if the traffic direction is downlink or uplink or to peer. |

The above information items can be transmitted in one or more frames. The above information items can be transmitted in newly defined frames or in any of the frames existing in the standard (e.g., A-control subfields, control frames, action frames, etc.). Some examples are as follows.

In one example, a newly defined element can carry the above stream-to-link mapping response information of Table 19. This can use the same element format as described in FIG. 42. In this example, each field/subfield of the response element can indicate the response to the corresponding field/subfield of the request element. For instance, the per link mapping list can contain the final stream-to-link mapping that is determined by the requestee. The response element can be carried in management frames that are exchanged between the requestor and the requestee.

In another example, a new action frame can carry the above stream-to-link mapping response information of Table 19. A stream-to-link mapping response action frame can have the same format as the stream-to-link mapping request action frame, with the format of Table 18 above.

The category field indicates the category of the action frame. The protected action field can enable to differentiate the protected action frame formats. The dialog token can be a non-zero value that can be chosen by the transmitter of the frame to identify the request/response transaction. The stream to link mapping field can contain one or more stream to link mapping elements as described previously to indicate the response.

Figure 45:
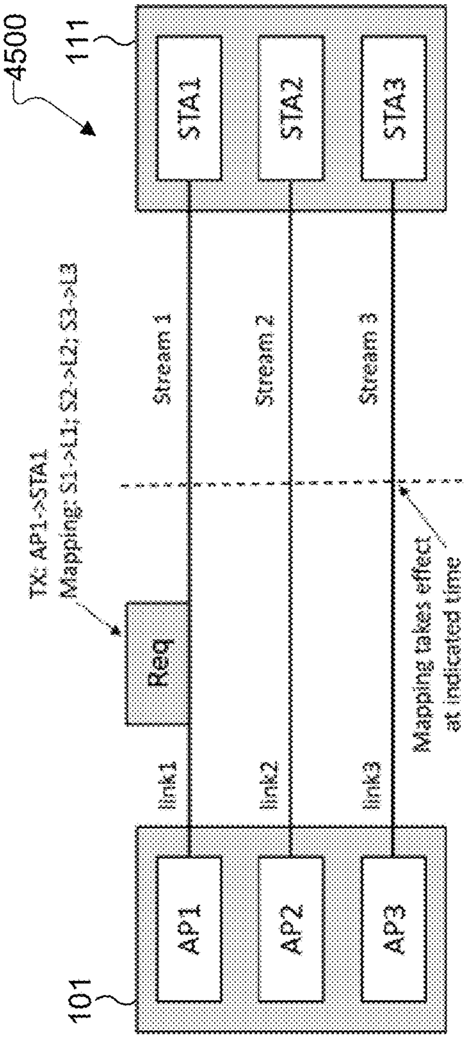
FIG. 45 illustrates an example operation including a stream-to-link mapping request frame according to embodiments of the present disclosure.

FIG. 45 illustrates an example operation 4500 including a stream-to-link mapping request frame according to embodiments of the present disclosure. As illustrated in FIG. 45, an AP MLD has three affiliated APs—AP1, AP2 and AP3. A non-AP MLD has three affiliated STAs—STA1, STA2 and STA3. There are three links setup between the AP MLD and the non-AP MLD—link1, link2 and link3.

In this example, the AP MLD wants to create a stream-to-link mapping in order to be able to map traffic of certain applications to certain links. E.g., link1 and link2 have lower congestion and better channel conditions, so the AP MLD wants to map to link1 and link2 the streams with ultra-low latency requirements as indicated by the non-AP MLDs in their SCS request and response setup. In this example, stream 1 (S1) is mapped to link1 (L1), stream 2 (S2) is mapped to link2 (L2) and stream 3 (S3) is mapped to link3 (L3).

The AP MLD transmits an action frame (as an example an action frame is considered, other types of frames can also be used) to the non-AP MLD. The action frame provides a request element with the requested stream-to-link mapping. At the indicated time, the mapping can take effect with the respective streams getting mapped to the indicated links.

Figure 46:
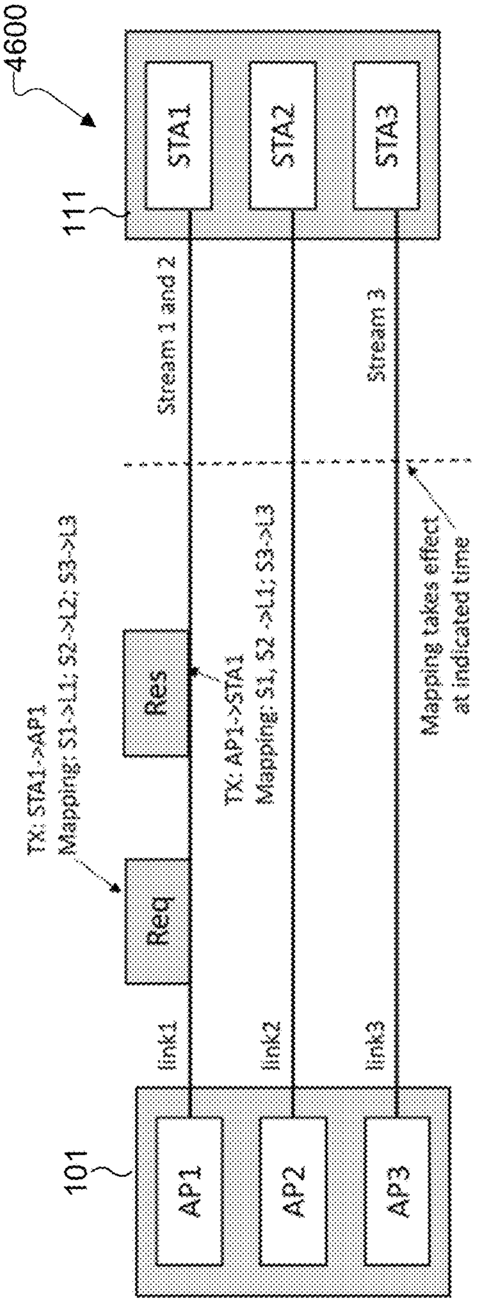
FIG. 46 illustrates an example operation including a stream-to-link mapping request and response frame according to embodiments of the present disclosure.

FIG. 46 illustrates an example operation 4600 including a stream-to-link mapping request and response frame according to embodiments of the present disclosure. As illustrated in FIG. 46, the non-AP MLD sends a request frame to the AP MLD on one of the links. The non-AP MLD proposes to map stream 1 to link1, stream 2 to link2 and stream 3 to link3. However, this mapping may not be possible (e.g., if AP2 affiliated with the AP MLD is going to face a self-interference problem from collocated non-WI-FI radios, if AP2 is going to go to doze state, if AP2 is receiving interference on link2 from a neighboring BSS, etc.). Thus, the AP MLD sends a response frame that indicates a modified mapping as illustrated. At the indicated time, the mapping can take effect.

According to one embodiment, the stream-to-link mapping can be torn down. The teardown frame can include one or more of the information items as indicated in Table 20.

TABLE 20

| Information item | Description |
|---|---|
| Teardown notification | An information item that can indicate that the frame is being transmitted for teardown purposes. |
| Post teardown behavior | An information item that can indicate the behavior post teardown. E.g., an information item that can indicate the stream-to-link mapping after the teardown is complete. If no such information item is present, there can be a default mapping in which all streams can be mapped to all the links. |

The above information items can be present in one or more frames. They can be present in newly defined frames or in any of the frames existing in the standard.

According to one example, a new teardown action frame can be defined. An example teardown action frame format is shown in Table 21.

TABLE 21

| Order | Information |
|---|---|
| 1 | Category |
| 2 | Protected Action |

The category field indicates the category of the action frame. The protected action field can enable to differentiate the protected action frame formats.

Figure 47:
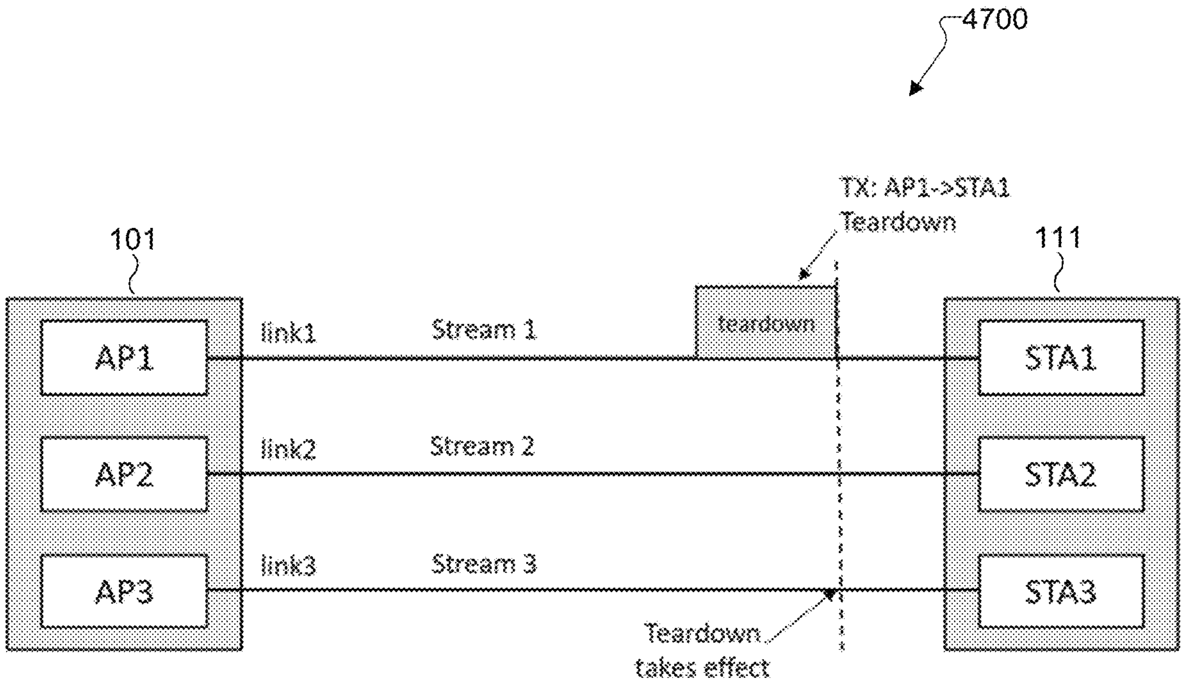
FIG. 47 illustrates an example operation of a stream-to-link mapping teardown according to embodiments of the present disclosure.

FIG. 47 illustrates an example operation 4700 of a stream-to-link mapping teardown according to embodiments of the present disclosure. As illustrated in FIG. 47, stream 1, stream 2, and stream 3 have been mapped to link1, link2, and link3, respectively. The AP MLD sends a teardown frame to the non-AP MLD. Following the teardown frame, the default mapping takes effect until a new mapping is set.

According to one embodiment, an AP MLD that supports the stream-to-link mapping feature can advertise its support in one or more frames that it transmits. In one example, these frames can be management frames such as beacons, probe responses, (Re) association responses, etc. There can be a field (e.g., a bit) which can be set to a specific value (e.g., 1) to indicate the support.

According to one embodiment, a non-AP MLD that supports the stream-to-link mapping feature can advertise its support in one or more frames that it transmits. In one example, these frames can be management frames such as probe requests, (Re) association requests, etc. There can be a field (e.g., a bit) which can be set to a specific value (e.g., 1) to indicate the support.

According to one embodiment, a frame that belongs to a particular stream/traffic identifier can be triggered for transmission. For instance, an AP affiliated with an AP MLD can transmit a trigger frame to a STA affiliated with a non-AP MLD to trigger a frame that belongs to a particular stream for transmission on the uplink. According to this embodiment, the trigger frame can contain one or more of the information items as indicated in Table 22.

TABLE 22

| Information item | Description |
|---|---|
| Traffic identifier | An information item that can describe the traffic information for the frame that is being triggered for transmission. E.g., TID |
| Stream identifier | An information item that can describe the stream for the frame that is being triggered for transmission. E.g., SCSID |

The above information can be included in existing trigger frame or in newly defined trigger frames or in any of the other frames in the standard.

When the trigger frame is received, the frame identified by the traffic identifier or stream identifier, or both can be transmitted by the recipient of the trigger frame.

According to one embodiment, an AP MLD that supports stream based triggering can advertise its support in one or more frames that it transmits. In one example, these frames can be management frames such as beacons, probe responses, (Re) association responses, etc. There can be a field (e.g., a bit) which can be set to a specific value (e.g., 1) to indicate the support.

According to one embodiment, a non-AP MLD that supports stream based triggering can advertise its support in one or more frames that it transmits. In one example, these frames can be management frames such as probe requests, (Re) association requests, etc. There can be a field (e.g., a bit) which can be set to a specific value (e.g., 1) to indicate the support.

The above procedures can be used by any device and are not limited to the type of devices that are described in the disclosure. One or more of the fields described in the example signaling can be included in any of the frames in the standard or other types of newly defined frames. One or more fields described in the examples can be absent.

Figure 48:
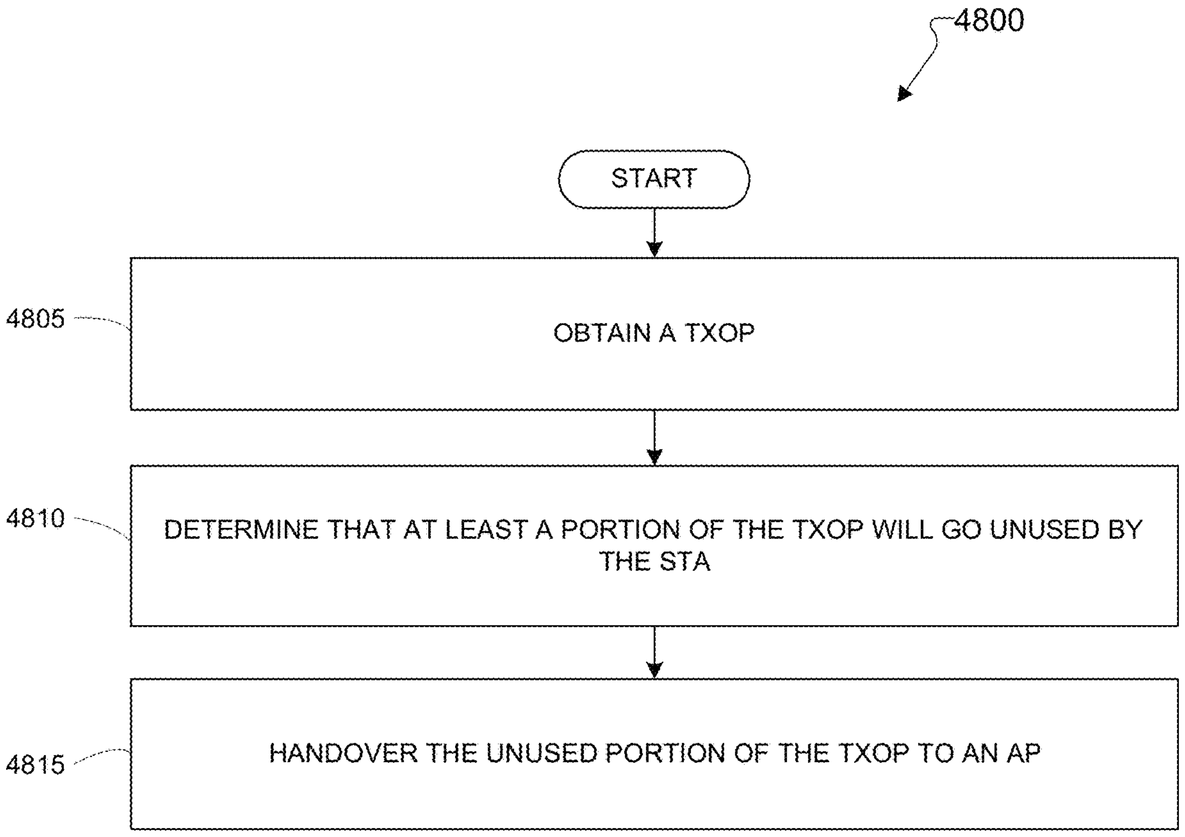
FIG. 48 illustrates an example process for facilitating QoS enhancements to support low latency operations according to various embodiments of the present disclosure.

FIG. 48 illustrates an example process 4800 for facilitating QoS enhancements to support low latency operations according to various embodiments of the present disclosure. In particular, the process 4800 facilitates a TXOP handover procedure whereby a STA hands over an unused portion of its TXOP to an AP. The process 4800 of FIG. 48 is discussed as being performed by a STA, but it is understood that a corresponding AP performs a corresponding process. Additionally, for convenience the process of FIG. 48 is discussed as being performed by a WI-FI STA, however, it is understood that any suitable wireless communication device could perform this process.

Referring to FIG. 48, at step 4805 the STA may obtain a TXOP. For example, a transceiver of the STA may perform any appropriate channel access procedures to obtain the TXOP Next, the STA may determine that at least a portion of the TXOP will go unused by the STA (step 4810). For example, the STA may determine that it will be able to complete transmission of the traffic backlog for which it obtained the TXOP in less than the entire TXOP duration. This can include a scenario in which transmission of the traffic begins at the start of the TXOP and completes before the end of the TXOP as well as a scenario in which transmission of the traffic can begin sometime after the start of the TXOP and complete before the end of the TXOP.

Finally, the STA hands over the unused portion of the TXOP to an AP (step 4815). That is, the STA performs a TXOP handover procedure as described in any of the embodiments disclosed herein above.

In some embodiments, the STA receives an explicit request from the AP to hand over the unused portion of the TXOP. For example, before step 4815 the STA may receive a request message from the AP indicating that the AP requests use of the unused portion of the TXOP, in response to which the STA may hand over the unused portion of the TXOP in step 4815. This may occur when the AP determines that the STA will not use the entire duration of the TXOP.

In some such embodiments the STA may additionally transmit, to the AP in response to the request message, a handover message indicating that the STA is handing over the unused portion of the TXOP to the AP. Such a handover message may include at least one of: an indication of a duration for which the STA is handing over the TXOP to the AP, an indication of whether the STA expects the AP to return the TXOP after the AP has finished using the TXOP, an indication of an action the STA expects the AP to take to return the TXOP or to end the TXOP after the AP has finished using the TXOP, and a request for the AP to prioritize transmission of downlink traffic to the STA during the TXOP.

In other such embodiments the AP, based on having transmitted the request message, may consider the TXOP to be handed over after the transmission by the STA is completed. That is, the STA may not explicitly respond to the request message from the AP, but the AP may assume that the STA performs the TXOP handover in response to the request message.

In some embodiments, there is a prearranged agreement between the STA and the AP to participate in a TXOP handover procedure, and the STA hands over the unused portion of the TXOP to the AP according to the agreement. That is, the STA performs the TXOP handover at step 4815 without any signaling from the AP to initiate the handover for that particular TXOP.

In some such embodiments the prearranged agreement is made based on explicit signaling between the STA and AP prior to step 4805. For example, before the TXOP is obtained at step 4805, the STA may receive a request message from the AP indicating that the AP requests the STA to participate in a TXOP handover procedure. The STA may then transmit to the AP in response to the request message, a response message indicating that the STA agrees to participate in the TXOP handover procedure.

In other such embodiments the STA may be configured to participate in the TXOP handover procedure under predefined conditions—that is, the prearranged agreement is implicitly defined in the network without any signaling between the STA and AP. The STA may then handover the unused portion of the TXOP to the AP based on a determination that the predefined conditions are met.

In some embodiments, the TXOP handover is initiated by the STA on its own. That is, the STA determines whether to handover the unused portion of the TXOP, and based on a determination to handover the unused portion of the TXOP, performs the handover to the AP. In such embodiments, the STA may also, based on the determination to handover the unused portion of the TXOP, transmit a handover message to the AP indicating the determination (e.g., so that the AP may be aware of the handover).

In some such embodiments, the STA may transmit this handover message such that other STAs are able to overhear the handover message. The other STAs are then enabled to anticipate downlink traffic from the AP during the TXOP based on overhearing the handover message.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless station (STA) comprising:

a transceiver configured to obtain a transmission opportunity (TXOP); and a processor operably coupled to the transceiver, the processor configured to:

determine that at least a portion of the TXOP will go unused by the STA, and determine to handover the unused portion of the TXOP to an access point (AP);

wherein the transceiver is further configured to:

based on the determination to handover the unused portion of the TXOP, transmit a handover message to the AP indicating the determination, and transmit the handover message such that other STAs are able to overhear the handover message; and wherein the processor is further configured to handover the unused portion of the TXOP to the AP.

2. The STA of claim 1, wherein:

the transceiver is further configured to receive a request message from the AP indicating that the AP requests use of the TXOP, and the processor is configured to handover the unused portion of the TXOP to the AP in response to the request message.

3. The STA of claim 2, wherein the transceiver is further configured to transmit, to the AP in response to the request message, a handover message indicating that the STA is handing over the unused portion of the TXOP to the AP.

4. The STA of claim 3, wherein the handover message includes at least one of:

an indication of a duration for which the STA is handing over the TXOP to the AP, an indication of whether the STA expects the AP to return the TXOP after the AP has finished using the TXOP, an indication of an action the STA expects the AP to take to return the TXOP or to end the TXOP after the AP has finished using the TXOP, and a request for the AP to prioritize transmission of downlink traffic to the STA during the TXOP.

5. The STA of claim 2, wherein the AP, based on having transmitted the request message, considers the TXOP to be handed over after transmissions by the STA are completed.

6. The STA of claim 1, wherein:

there is a prearranged agreement between the STA and the AP to participate in a TXOP handover procedure, and the processor is configured to handover the unused portion of the TXOP to the AP according to the agreement.

7. The STA of claim 1, wherein the transceiver is further configured to:

before the TXOP is obtained, receive a request message from the AP indicating that the AP requests the STA to participate in a TXOP handover procedure, and transmit, to the AP in response to the request message, a response message indicating that the STA agrees to participate in the TXOP handover procedure.

8. The STA of claim 1, wherein:

the STA is configured to participate in a TXOP handover procedure under predefined conditions, and the processor is configured to handover the unused portion of the TXOP to the AP based on a determination that the predefined conditions are met.

9. The STA of claim 1, wherein the other STAs are enabled to anticipate downlink traffic from the AP during the TXOP based on overhearing the handover message.

10. A method performed by a wireless station (STA) device, the method comprising:

obtaining a transmission opportunity (TXOP);

determining that at least a portion of the TXOP will go unused by the STA;

determining to handover the unused portion of the TXOP to an access point (AP);

based on the determination to handover the unused portion of the TXOP, transmitting a handover message to the AP indicating the determination;

transmitting the handover message such that other STAs are able to overhear the handover message; and handing over the unused portion of the TXOP to the AP.

11. The method of claim 10, further comprising:

receiving a request message from the AP indicating that the AP requests use of the TXOP; and handing over the unused portion of the TXOP to the AP in response to the request message.

12. The method of claim 11, further comprising transmitting, to the AP in response to the request message, a handover message indicating that the STA is handing over the unused portion of the TXOP to the AP.

13. The method of claim 12, wherein the handover message includes at least one of:

an indication of a duration for which the STA is handing over the TXOP to the AP, an indication of whether the STA expects the AP to return the TXOP after the AP has finished using the TXOP, an indication of an action the STA expects the AP to take to return the TXOP or to end the TXOP after the AP has finished using the TXOP, and a request for the AP to prioritize transmission of downlink traffic to the STA during the TXOP.

14. The method of claim 11, wherein the AP, based on having transmitted the request message, considers the TXOP to be handed over after transmissions by the STA are completed.

15. The method of claim 10, wherein:

there is a prearranged agreement between the STA and the AP to participate in a TXOP handover procedure, and the method further comprises handing over the unused portion of the TXOP to the AP according to the agreement.

16. The method of claim 10, further comprising:

before the TXOP is obtained, receiving a request message from the AP indicating that the AP requests the STA to participate in a TXOP handover procedure; and transmitting, to the AP in response to the request message, a response message indicating that the STA agrees to participate in the TXOP handover procedure.

17. The method of claim 10, wherein:

the STA participates in a TXOP handover procedure under predefined conditions, and the method further comprises handing over the unused portion of the TXOP to the AP based on a determination that the predefined conditions are met.

18. The method of claim 10, wherein the other STAs are enabled to anticipate downlink traffic from the AP during the TXOP based on overhearing the handover message.

* * * * *